United States Patent
Ohara

(10) Patent No.: US 7,587,201 B2
(45) Date of Patent: Sep. 8, 2009

(54) NETWORK APPARATUS CAPABLE OF CONFIRMING WHETHER A DEVICE IS OPERATING PROPERLY AFTER A CHANGE OF COMMUNICATION SETTINGS

(75) Inventor: Kiyotaka Ohara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 902 days.

(21) Appl. No.: 10/924,918

(22) Filed: Aug. 25, 2004

(65) Prior Publication Data

US 2005/0048953 A1 Mar. 3, 2005

(30) Foreign Application Priority Data

Aug. 29, 2003 (JP) ............................. 2003-307726

(51) Int. Cl.
| | |
|---|---|
| H04W 24/00 | (2009.01) |
| H04B 17/00 | (2006.01) |
| H04B 1/38 | (2006.01) |
| G06F 11/00 | (2006.01) |
| H04L 1/00 | (2006.01) |
| H04L 12/26 | (2006.01) |

(52) U.S. Cl. ................. 455/423; 455/67.11; 455/412.1; 455/557; 370/216; 370/242

(58) Field of Classification Search ................. 455/423, 455/67.11, 412.1
See application file for complete search history.

(56) References Cited

U.S. PATENT DOCUMENTS

2002/0083228 A1* 6/2002 Chiloyan et al. ................ 710/9
2002/0136214 A1* 9/2002 Do et al. ...................... 370/338
2003/0037155 A1* 2/2003 Lee .............................. 709/230
2003/0219008 A1* 11/2003 Hrastar ........................ 370/338
2004/0062262 A1* 4/2004 Venteicher et al. ........... 370/431
2004/0180692 A1* 9/2004 Yang et al. ................... 455/557
2005/0220054 A1* 10/2005 Meier et al. .................. 370/331
2006/0120336 A1* 6/2006 Fantaske ...................... 370/338

FOREIGN PATENT DOCUMENTS

| JP | A 2000-156689 | 6/2000 |
|---|---|---|
| JP | A 2000-165390 | 6/2000 |
| JP | A 2001-251337 | 9/2001 |
| WO | WO 96/38994 | 12/1996 |
| WO | WO 9956494 A1 * | 11/1999 |

\* cited by examiner

*Primary Examiner*—Nick Corsaro
*Assistant Examiner*—Tangela T Chambers
(74) *Attorney, Agent, or Firm*—Oliff & Berridge, PLC

(57) ABSTRACT

A network apparatus has a wireless communication unit communicating wirelessly with a network apparatus, a connection control unit controlling the wireless communication unit based on connection data to establish connection with the network apparatus, a first storage unit storing first connection data for establishing connection with a first network apparatus, a second storage unit storing second connection data for establishing connection with a second network apparatus, a recording control unit recording the second connection data into the second storage unit when the connection control unit establishes connection with the first network apparatus, a test unit trying to establish connection with the second network apparatus when the connection control unit cuts off the connection with the first network apparatus after the recording control unit records the second connection data, and a return control unit re-establishing the connection with the first network apparatus after trying to establish connection with the second network apparatus.

25 Claims, 20 Drawing Sheets

FIG. 4

| | | | |
|---|---|---|---|
| Mode | Infinitestructure Mode ▽ | | |
| SSID | DxiiKyt088 | Browse | |
| Channel | 3 | | |

| | | |
|---|---|---|
| Authentication | Shared key ▽ | |
| User ID | | |
| Password | | |
| Encryption | WEP ▽ | |

| | USE | KEY | TYPE | SIZE |
|---|---|---|---|---|
| WEP KEY 1 | ● | 6162636465 | Hexadecimal ▽ | 40(64) bits ▽ |
| WEP KEY 2 | ○ | abcdefghijklm | ASCII ▽ | 104(128) bits ▽ |
| WEP KEY 3 | ○ | | Hexadecimal ▽ | not set ▽ |
| WEP KEY 4 | ○ | | Hexadecimal ▽ | not set ▽ |

Test

OK    Cancel

FIG. 9

| | | | |
|---|---|---|---|
| Mode | Infrastructure Mode ▽ | | |
| SSID | DxiiKyt088 | Browse | |
| Channel | 3 | | |

| | | | |
|---|---|---|---|
| Authentication | Shared key ▽ | | |
| User ID | | | |
| Password | | | |
| Encryption | WEP ▽ | | |

| | USE | KEY | TYPE | SIZE |
|---|---|---|---|---|
| WEP KEY 1 | ● | 6162636465 | Hexadecimal ▽ | 40(64) bits ▽ |
| WEP KEY 2 | ○ | abcdefghijklm | ASCII ▽ | 104(128) bits ▽ |
| WEP KEY 3 | ○ | | Hexadecimal ▽ | not set ▽ |
| WEP KEY 4 | ○ | | Hexadecimal ▽ | not set ▽ |

OK     Cancel

FIG. 17

| | | |
|---|---|---|
| Mode | Infrastructure Mode ▽ | |
| SSID | DxiiKyt088 | Browse |
| Channel | 3 | |

| | | |
|---|---|---|
| Authentication | Shared key ▽ | |
| User ID | | |
| Password | | |
| Encryption | WEP ▽ | |

| | USE | KEY | TYPE | SIZE |
|---|---|---|---|---|
| WEP KEY 1 | ● | 6162636465 | Hexadecimal ▽ | 40(64) bits ▽ |
| WEP KEY 2 | ○ | abcdefghijklm | ASCII ▽ | 104(128) bits ▽ |
| WEP KEY 3 | ○ | | Hexadecimal ▽ | not set ▽ |
| WEP KEY 4 | ○ | | Hexadecimal ▽ | not set ▽ |

Test     Test Result

OK     Cancel

NETWORK APPARATUS CAPABLE OF CONFIRMING WHETHER A DEVICE IS OPERATING PROPERLY AFTER A CHANGE OF COMMUNICATION SETTINGS

BACKGROUND OF THE INVENTION

1. Field of the Invention

The present invention relates to a network apparatus which constructs a wireless network with other wireless access points or wireless terminals.

2. Description of the Related Art

In recent years, when a user engaging in network management performs various managements (such as installation of software, maintenance with a change in settings, etc.), each network apparatus connected to a network such as a LAN (Local Area Network) has been often managed through the network not by use of an operation portion provided additionally in the network apparatus but by use of a terminal unit (hereinafter referred to as "user's terminal") located on the same network from necessity of central control (the network apparatus to be managed from the user's terminal will be also referred to as "to-be-managed device").

Such a kind of remote management is obtained by management using SNMP (Simple Network Management Protocol) or embedded Web server technology. As a result, the user can perform management of a large number of to-be-managed devices disposed on the network, using the user's terminal at one place.

As such a network apparatus, JP-A-2001-251337 mentioned below discloses a device having a function as follows. Assume that settings on the side of a to-be-managed device (router) are changed on the side of a user's terminal (host) connected though a network, and there is a problem in the changed settings. Due to the problem, connection between the user's terminal (host) and the to-be-managed device (router) may be cut. In such a case, the settings are restored to their original settings on the to-be-managed device (router) side when a period of time has passed. Thus, the connection between the user's terminal (host) and the to-be-managed device (router) is recovered.

With such a network apparatus, the connection between the user's terminal (host) and the to-be-managed device (router) is maintained with the changed settings as long as there is no problem in the changed settings of the to-be-managed device (router). Accordingly the user can confirm from the user's terminal (host) side via the network the fact that the to-be-managed device (router) after changing the settings is operating properly. On the other hand, when there is a problem in the changed settings, the connection between the user's terminal (host) and the to-be-managed device (router) is restored with the settings which have not been changed. Accordingly the user can confirm from the user's terminal (host) side via the network the fact that there has been a problem in the changed settings. Thus, the user can redo changing the settings or perform other management works if necessary.

JP-A-2001-251337 is referred to as a related art.

However, setting items on the to-be-managed device side may include a setting item such that the connection between the user's terminal and the to-be-managed device will be cut as a result of proper operation of the to-be-managed device after the setting item is changed. When such a setting item is changed, access to the to-be-managed device via the network cannot be gained from the user's terminal, unlike the network apparatus according to JP-A-2001-251337. In this case, therefore, there is a defect that the user cannot confirm on the user's terminal side whether the to-be-managed device after changing the settings is operating properly or not.

Specific description will be made with terms used in wireless LAN systems in conformity with IEEE 802.11 series standards (IEEE 802.11a, IEEE 802.11b, IEEE802.11g, etc.) by way of example. When a user's terminal and a to-be-managed device have been connected through a wireless network, settings about wireless connection of the to-be-managed device may be changed from the user's terminal. In this event, a communication channel used by the to-be-managed device before changing the settings may be changed for another communication channel, or identification information (SSID: Service Set Identifier) used for identifying the network to be connected before changing the settings may be changed for another identification information. In such a case, communication via the wireless network cannot be established between the user's terminal and the to-be-managed device. Even though the user's terminal and the to-be-managed device use network addresses corresponding to one and the same network before changing the settings, the network address of the to-be-managed device may be changed with the settings being changed. In this event, communication cannot be established between the user's terminal and the to-be-managed device. Accordingly, the situations presented here by way of example lead to a problem that the user cannot confirm on the user's terminal side whether the to-be-managed device after changing the settings is operating properly or not.

SUMMARY OF THE INVENTION

The object of the invention is to provide a network apparatus which changes over to a state where connection with a user's terminal will be cut off when various settings are changed from the user's terminal via a network, whereas information indicating whether the network apparatus can or not operate properly after changing the settings can be given to the user's terminal via the network so that a user can confirm the information on the user's terminal side.

The invention provides a network apparatus having: a wireless communication unit that communicates with a network apparatus wirelessly; a connection control unit that controls the wireless communication unit based on connection data about wireless communication so as to establish connection with the network apparatus; a first storage unit that stores first connection data required for establishing connection with a first network apparatus; a second storage unit that stores second connection data required for establishing connection with a second network apparatus; a recording control unit that records the second connection data into the second storage unit in a state that the connection control unit establishes the connection with the first network apparatus; a test unit that tries to establish connection with the second network apparatus based on the second connection data when the connection control unit cuts off the connection with the first network apparatus after the recording control unit records the second connection data in the second storage unit; and a return control unit that establishes the connection with the first network apparatus again based on the first connection data after the test unit tried to establish connection with the second network apparatus.

In the network apparatus, when the first network apparatus is a wireless access point, a terminal unit capable of making communication via the wireless access point is a user's terminal, whereas when the first network apparatus is a wireless terminal, the wireless terminal is the user's terminal, and the test unit tries to establish connection with the second network apparatus when the network apparatus receives a request from the user's terminal to try to change over a target of communication from the first network apparatus to the second network apparatus.

The network apparatus has a test result transmitting unit that informs a user's terminal of test result data showing a test result of the connection with the second network apparatus after the connection with the first network apparatus is established again, wherein the test result transmitting unit informs the user's terminal of the test result data when the network apparatus is requested from the user's terminal to transmit the test result data.

In the above network apparatus, normally, the connection control unit controls the wireless communication unit based on the first connection data stored in the first storage unit, so as to establish wireless connection with the first network apparatus.

On the other hand, according to this network apparatus, the recording control unit makes the second storage unit store the second connection data specified by an instruction issued from the user's terminal ("a terminal device capable of data communication via the first wireless access point" or "the first wireless terminal") operated by the user to execute or trail control to change over a target of communication from the first network apparatus to the second network apparatus in the state where the wireless connection with the first network apparatus has been established. Then, the test unit controls the wireless communication unit based on the second connection data stored in the second storage unit so as to cut off the connection with the first network apparatus and to test as to whether wireless communication with the second network apparatus can be established or not. After this testing, the return control unit controls the wireless communication unit again based on the first connection data stored in the first storage unit so as to restore the state where the wireless communication with the first network apparatus has been established. Then, the test result transmitting unit transmits the user's terminal test result data indicating the result of the testing by the test unit.

With this network apparatus, when an instruction to execute or trial control to change over a target of communication from the first network apparatus to the second network apparatus is received from the user's terminal via the network, whether the device can operate properly after the execution of the control or not can be tested before the execution of the control, and information indicating the result of the testing can be reported to the user's terminal via the network in spite of the configuration in which the connection between the device and the user's terminal will be cut if the control is executed. Accordingly, the user can confirm, on the user's terminal side, the information reported from the device, and if necessary, the user can carry out operation such as reviewing the contents of the second connection data so that the device can operate properly.

In the network apparatus described above, the wireless communication unit and the connection control unit may be equivalent to those used in a known wireless network apparatus (wireless access point or wireless terminal). For example, units capable of establishing wireless connection with a wireless network in a system conforming to the IEEE 802.11 series standards may be used by way of example. In order to make it easy to understand, the following description will be made while appropriately using terms in wireless LAN systems in conformity with the IEEE 802.11 series standards if necessary. Not to say, however, the above is not a technique applicable only to specific wireless LAN systems.

In addition, connection data about wireless connection include all the data required for establishing wireless connection with a network. When any piece of the data has an error, proper wireless connection cannot be established. The data required can be changed in accordance with the standards to be conformed to, the security level, and so on. Examples of pieces of the connection data include a communication channel to be used for wireless communication, identification information (SSID) serving to identify the network to be connected to, an encryption key (WEP: Wireless Encryption Privacy) serving to encrypt data, a network address, etc., which may be each necessary to establish wireless connection with a network.

It is generally desired that the first storage unit is a nonvolatile storage in which the aforementioned connection data will not disappear even if power supply to the device is cut off. For example, the first storage unit may be formed out of a nonvolatile RAM (NVRAM) or a flash memory. When the first storage unit itself is a volatile storage, another nonvolatile storage may be used separately from the first storage unit so that data can be copied from the nonvolatile storage to the first storage unit. The second storage unit does not have to be a nonvolatile storage particularly when the test unit uses it. However, once settings in the device have been changed, the second connection data stored in the second storage unit have to be handled as new first connection data. Therefore, when the second storage unit is a volatile storage, it is desired that the second connection data are copied into the nonvolatile first storage unit and set as new first connection data. Alternatively, the first and second storage units may be formed as nonvolatile storages having one and the same configuration, while a flag indicating which storage to use as the first storage unit (or the second storage unit) is stored in a nonvolatile management region. In this case, the initial second storage unit itself can be handled directly as a new first storage unit only if the flag is rewritten. It is therefore possible to save the trouble of copying the second connection data into the nonvolatile first storage unit as described above.

The invention provides a network apparatus having: a wireless communication unit that communicates with a network apparatus wirelessly; a connection control unit that controls the wireless communication unit based on connection data about wireless communication so as to establish connection with the network apparatus; a first storage unit that stores first connection data required for establishing connection with a first network apparatus; a second storage unit that stores second connection data required for establishing connection with a second network apparatus; a recording control unit that records the second connection data into the second storage unit in a state that the connection control unit establishes the connection with the first network apparatus; a test unit that tries to establish connection with the second network apparatus based on the second connection data when the connection control unit cuts off the connection with the first network apparatus after the recording control unit records the second connection data in the second storage unit; and a return control unit that establishes the connection with the first network apparatus again based on the first connection data after the test unit tried to establish connection with the second network apparatus.

According to the network apparatus, when various settings are changed from a user's terminal via a network, the device changes over to a state where connection with the user's terminal will be cut, but the device can report, to the user's terminal via the network, information indicating whether the device can or not operate properly after the settings are changed. Thus, a user can confirm the information on the user's terminal side.

BRIEF DESCRIPTION OF THE DRAWINGS

FIG. 4 is a diagram showing a Web page to be used for changing settings about wireless connection of the printer in the first embodiment;

FIG. 9 is a diagram showing a Web page to be used for changing settings about wireless connection of the printer in the second embodiment;

FIG. 17 is a diagram showing a Web page to be used for changing settings about wireless connection of the printer in an eighth embodiment;

DETAILED DESCRIPTION OF THE PREFERRED EMBODIMENTS

Embodiments of the invention will be described.

First Embodiment

A network apparatus will be described below as a first embodiment of the invention. The network apparatus is a network printer (hereinafter referred to as "printer" simply) which can arrange a network using a wireless LAN system in conformity with IEEE 802.11 series standards and which is designed to receive print data transmitted from another network apparatus and print the print data. More in particular, the printer is designed to serve as a wireless terminal in an infrastructure system wireless network so as to establish wireless connection with a wireless access point. The print data are transmitted from the aforementioned other network apparatus to the printer via the wireless access point. The printer is also designed as a complex machine having an image scanner function, a facsimile function, a copying machine function, etc. as well as the aforementioned network printer function.

Figure 1:
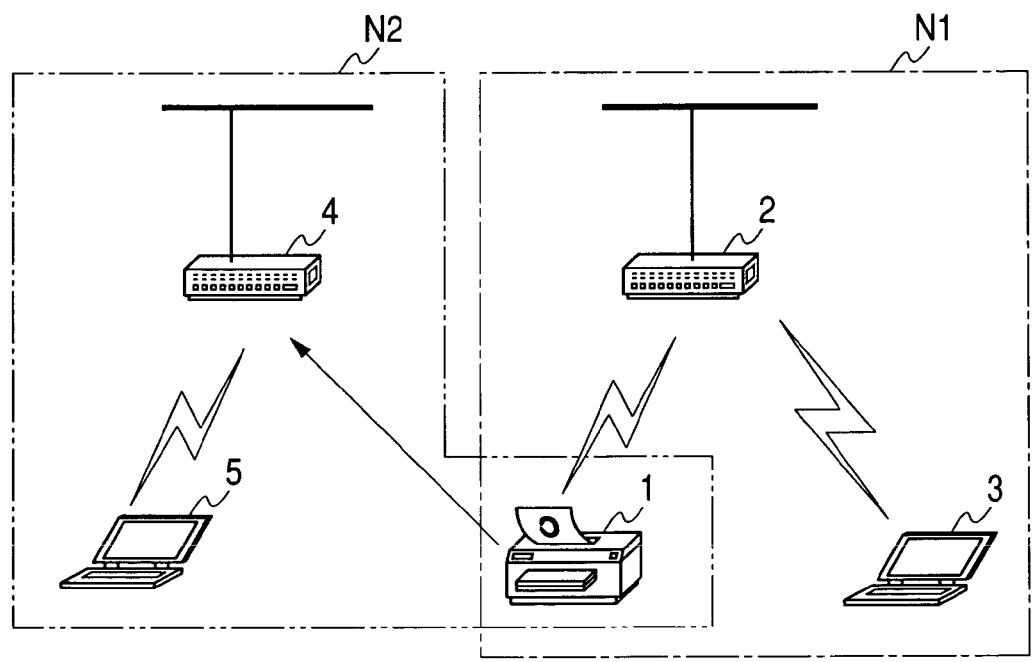
FIG. 1 is a configuration diagram showing a network in a first embodiment.

FIG. 1 is a diagram showing an example of a network in which a printer 1 functioning as the network apparatus is incorporated as a node. In FIG. 1, two independent systems, that is, a first network N1 and a second network N2 are depicted. A first wireless access point 2 and a first personal computer 3 serving as a wireless terminal are connected to the first network N1, and a second wireless access point 4 and a second personal computer 5 serving as a wireless terminal are connected to the second network N2. In this embodiment, the printer 1 selects one alternatively from the aforementioned two systems of networks and sets it as a target of connection. In the following description, assume that the printer 1 in the initial state has established wireless connection with the first wireless access point 2 and has been incorporated as a node of the first network N1, and after executing the process which will be described later, the printer 1 establishes wireless connection with the second access point 4 and changes over to a state where the printer 1 has been incorporated as a node of the second network N2.

Figure 2:
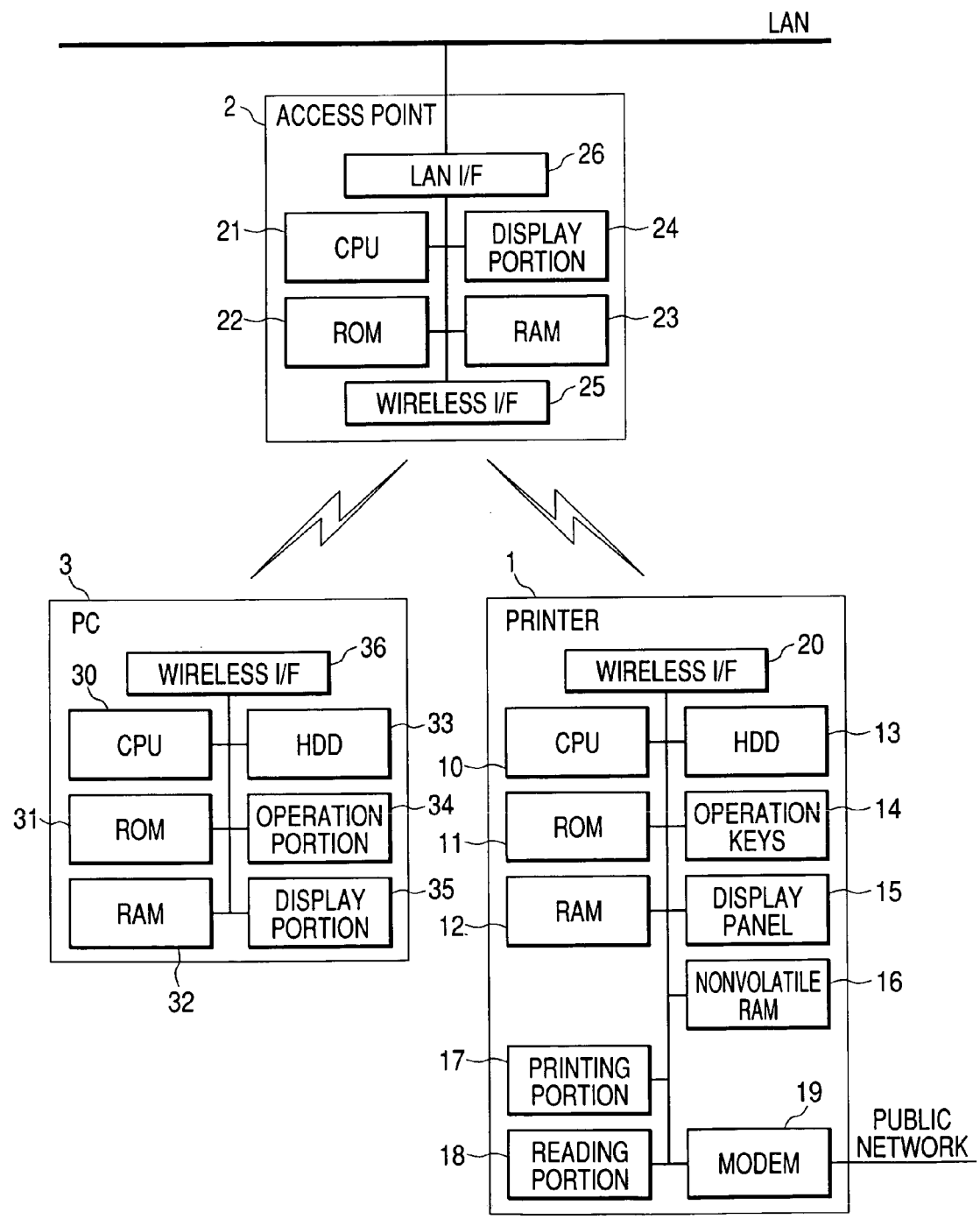
FIG. 2 is a configuration diagram showing the internal configuration of each device constituting the network in the first embodiment.

FIG. 2 is a diagram showing the internal configurations of the printer 1, the first wireless access point 2 and the first personal computer 3.

The printer 1 has a CPU 10, a ROM 11, a RAM 12, a hard disk drive (HDD) 13, operation keys 14, a display panel 15, a nonvolatile RAM (NVRAM) 16, a printing portion 17, a reading portion 18, a modem 19, a wireless interface portion (wireless I/F) 20, etc. The CPU 10 is a unit for executing control of each part of the printer 1 and various arithmetic operations in accordance with control programs stored in the ROM 11. The CPU 10 controls the wireless I/F 20 to establish wireless connection with a target of communication (functioning as the connection control unit). The ROM 11 stores various kinds of data as well as the aforementioned control programs. The RAM 12 is a unit for temporarily storing various kinds of data calculated during processing by the CPU 10. When the target of communication is changed over by the process which will be described later, second connection data required for establishing wireless connection with the changed-over target of communication is stored in the RAM 12 (functioning as the second storage unit). The HDD 13 is a storage unit for storing comparatively large-size image data such as images to be transmitted/received by the facsimile function, imaged read by the image scanner function, images to be printed by the printer function, etc. The operation keys 14 are operated for giving basic instructions to the printer 1. The display panel 15 displays the state of the printer 1 and other information. The NVRAM 16 is a unit for storing data to be prevented from disappearing even during disconnection of the power, the data including settings about the printer 1. First connection data required for establishing wireless connection with a target of connection at the time of starting up the printer 1 are stored in the NVRAM 16 (functioning as the first storage unit). The printing portion 17 is a portion which can execute printing on a recording medium such as paper, and operates at the time of printing print data by the printer function, printing received images by the facsimile function, printing copied images by the copying machine function, or the like, and which can also print a test result as will be described later (functioning as a printing unit). The reading portion 18 can read an image from a document set in an automatic document feeder (not shown) or a document placed on a contact glass of a flat bed, and operates at the time of reading an image by the image scanner function, reading an image to be transmitted by the facsimile function, or the like. The modem 19 can execute voice communication or data communication with the outside through a public network, and operates at the time of transmitting/receiving images by the facsimile function, or calling by a telephone function. The wireless I/F 20 (functioning as the wireless communication unit) can execute data communication with a wireless access point.

Figure 23:
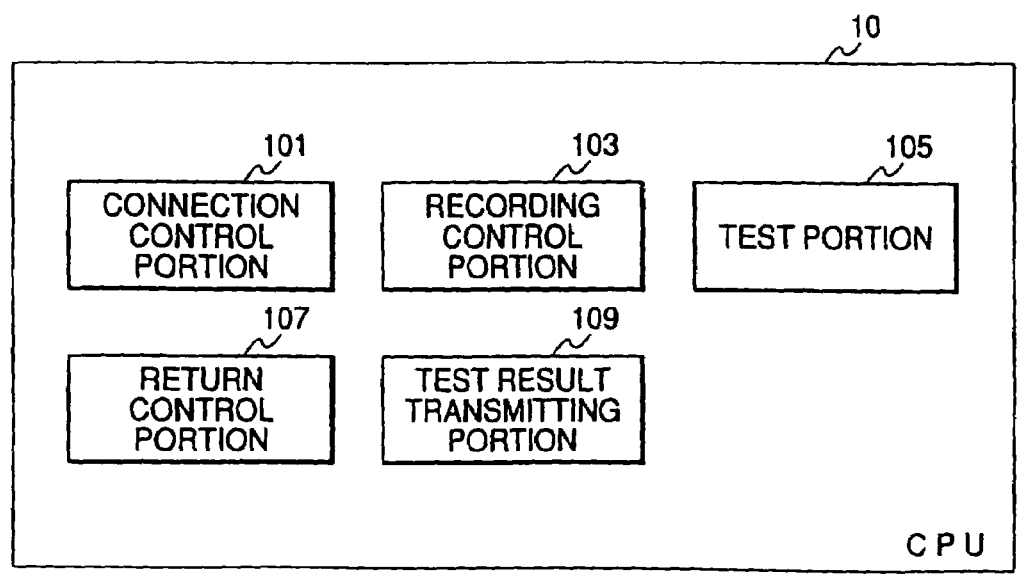
FIG. 23 is a configuration diagram showing a CPU.

The CPU 10 has a connection control portion 101, a recording control portion 103, a test portion 105, a return control portion 107 and a test result transmitting portion 109 as shown in FIG. 23. The connection control portion 101 controls the wireless I/F 20 based on connection data about wireless communication so as to establish connection with a target of communication. The recording control portion 103 records second connection data into the RAM 12 in the state where the connection with the target of communication has been established. After the recording control portion 103 has recorded the second connection data in the RAM 12, the test portion 105 allows the connection control portion 101 to cut off the connection with the first wireless access point 2 and tries to establish connection with the second wireless access point 4 based on the second connection data. After the test portion 105 has made tried to establish connection with the second wireless access point 4, the return control portion 107 establishes the connection with the first wireless access point 2 again based on the first connection data. After the return control portion 107 has established the connection with the first wireless access point 2 again, the test result transmitting portion 109 reports, to the first personal computer 3, test result data indicating the result of testing the connection with the second wireless access point 4.

The first wireless access point 2 has a CPU 21, a ROM 22, a RAM 23, a display portion 24, a wireless interface portion (wireless I/F) 25, a LAN interface portion (LAN I/F) 26, etc. The CPU 21 executes control of each part of the first wireless access point 2 and various arithmetic operations in accordance with control programs stored in the ROM 22. The ROM 22 stores various kinds of data as well as the aforementioned control programs. The RAM 23 temporarily stores various kinds of data. The display portion 24 can display the state of the first wireless access point 2 and other information. The wireless I/F 25 can execute data communication with a wireless terminal. The LAN I/F 26 is connected to a cable network through a LAN cable so as to be able to carry out data communication with a network apparatus on the cable network.

The first personal computer 3 is designed to serve as a wireless terminal when a wireless LAN card is inserted into a card slot. The first personal computer 3 has a CPU 30, a ROM 31, a RAM 32, a hard disk drive (HDD) 33, an operation portion 34, a display portion 35, a wireless interface portion (wireless I/F) 36, etc. The CPU 30 executes control of each part of the first personal computer 3 and various arithmetic operations in accordance with control programs stored in the ROM 31. The ROM 31 stores various kinds of data as well as the aforementioned control programs. The RAM 32 can temporarily store various kinds of data. The HDD 33 stores various application programs and data files to be used by the first personal computer 3. The operation portion 34 is constituted by a keyboard, various pointing devices, etc. The display portion 35 is constituted by a liquid crystal display capable of displaying a color image, or the like. The wireless I/F 36 is constituted by insertion of a wireless LAN card into the first personal computer 3 as described above, so that data communication can be performed between the first personal computer 3 and a wireless access point.

The second wireless access point 4 is designed in the same manner as the first wireless access point 2. Since the both are identical in view of functions, the illustration of the internal configuration of the second wireless access point 4 is omitted. The second personal computer 5 is designed in the same manner as the first personal computer 3. Since the both are identical in view of functions, the illustration of the internal configuration of the second personal computer 5 is also omitted.

Figure 3:
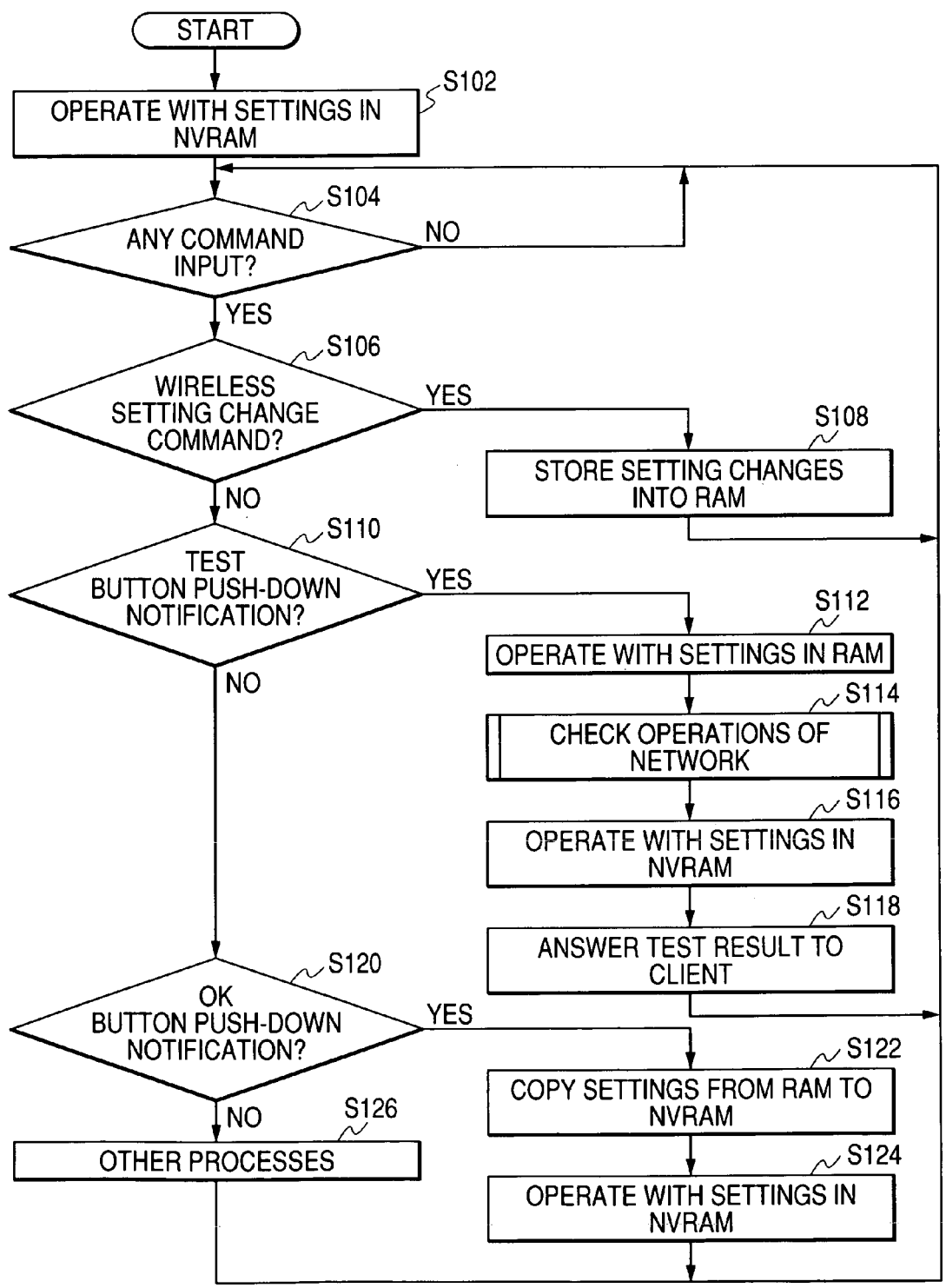
FIG. 3 is a flow chart showing a whole process to be executed by a printer in the first embodiment.

Next, the process to be executed by the printer 1 will be described with reference to the flow chart of FIG. 3. The process shown in FIG. 3 is a process to be executed by the printer 1 as soon as the power of the printer 1 is turned on.

As soon as the process is initiated, the printer 1 first operates in accordance with the settings in the NVRAM 16 (S102). Set values of various items which can be set in the printer 1 have been stored in the NVRAM 16. In this embodiment, the set values include some data (first connection data according to the invention) required for establishing connection with the first wireless access point 2. The CPU 10 controls the wireless I/F 20 in accordance with the first connection data. Thus, wireless connection is initially established between the printer 1 and the first wireless access point 2.

Next, the printer 1 waits for a command input via a network (S104: NO). On this occasion, the printer 1 is designed to start required processes in accordance with various events such as an incoming facsimile call and an operation using the operation keys 14 as well as the command input via the network. However, these other processes are not directly concerned with a main portion of the invention. Therefore, they are not shown in the flow chart.

When there is a command input via the network (S104: YES), the printer 1 checks whether the command is a "wireless setting change command" or not (S106). The wireless setting change command is data including setting items to be changed and set values of the changed setting items. In this embodiment, a list of setting items about wireless settings of the printer 1 can be provided from the printer 1 in the form of a Web page. For example, when a user uses a browser in the first personal computer 3 and issues a request for distribution of the Web page to the printer 1, the printer 1 serves as a Web server such that a Web page as shown in FIG. 4 is displayed on the display portion 35 of the first personal computer 3. The user confirms the setting items about the wireless settings of the printer 1 displayed on the display portion 35, and changes the set value of each setting item if necessary. As a result, the aforementioned wireless setting change command is transmitted from the first personal computer 3 to the printer 1 via the first wireless access point 2.

When the command received by the printer 1 is a wireless setting change command in Step S106 (S106: YES), changed settings are stored in the RAM 12 (S108). In the same manner as in the NVRAM 16 described previously, a region for storing set values of various items which can be set in the printer 1 is secured in the RAM 12. Of the setting items included in the region, items to be changed are updated from set values that have not been changed to set values that have been changed. In this embodiment, the updated set values include some data (second connection data according to the invention) required for establishing connection with the second wireless access point 4. When Step S108 is terminated, the process returns to Step S104. The CPU 10 executing Step S108 functions as a recording control unit.

On the other hand, when the command received by the printer 1 is not a wireless setting change command in Step S106 (S106: NO), the printer 1 subsequently checks whether the command is a "TEST button push-down notification" or not (S110). The TEST button push-down notification is a command transmitted from the first personal computer 3 to the printer 1 via the first wireless access point 2 when a "TEST" button on the screen is pushed down (precisely the "TEST" button is pointed by the pointing device of the operation portion 34 and a button of the pointing device is pushed down, or a shortcut key assigned on the keyboard of the operation portion 34 so as to be associated with the "TEST" button is pushed down; hereinafter such an operation will be referred to as "pushing down the "TEST" button" simply) in the state where the Web page shown in FIG. 4 is displayed on the display portion 35 of the first personal computer 3.

When the command received by the printer 1 is a TEST button push-down notification in Step S110 (S110: YES), the printer 1 operates in accordance with the settings in the RAM 12 (S112). The set values after the setting change have been stored in the RAM 12 due to Step S108 described previously. The updated set values include the second connection data. The CPU 10 controls the wireless I/F 20 in accordance with the second connection data so as to execute control to change over the target of connection of the printer 1 from the first wireless access point 2 to the second wireless access point 4.

As a result of the control, the wireless connection between the printer 1 and the first wireless access point 2 is cut. In addition, in some contents of the set values updated in the aforementioned step, wireless connection between the printer 1 and the second wireless access point 4 can be established, but in some contents of the updated set values, the wireless connection between the both cannot be established. Further, even when the wireless connection between the both can be established, the printer 1 and the first personal computer 3 cannot communicate with each other because the first wireless access point 2 and the second wireless access point 4 are not connected to each other. In addition, in some case, the printer 1 may not take part in the network even when the wireless connection between the both can be established.

The operations of the network are therefore checked to test as to whether the wireless connection between the printer 1 and the second wireless access point 4 could be established or not and whether the printer 1 could be correctly connected to the network or not (S114). In particular, Step S114 is a testing process as shown in the flow chart of FIG. 5.

When the testing process is initiated, the printer 1 first carries out a first test item (TEST 1) on trial (S202). The first test item is a test as to whether the second wireless access point 4 can be detected or not. As for a specific testing method, for example, the printer 1 checks whether it can receive beacons sent by the second wireless access point 4 or not while changing over a wireless channel (1 to 14) (passive scan). Alternatively, the printer 1 issues a probe request while changing over the wireless channel, and checks whether it can receive a probe response from the second wireless access point 4 or not (active scan). Then, the printer 1 confirms whether network identification information (SSID) of the second wireless access point 4 side included in each beacon is identical to network identification information (SSID) set on the printer 1 side or not.

The printer 1 then determines whether the result of TEST 1 carried out on trial is failed or not (S204). When it is concluded that the result is failed, it can be, for example, imagined that there is no access point, there is no coincidence in terms of the network identification information (SSID), or the channel is incorrect. When it is concluded that the result is failed (S204: YES), the printer 1 makes the RAM 12 store information indicating failure in TEST 1 (S206), and terminates the testing process.

On the contrary, when it is concluded that the result of TEST 1 carried out on trial is not failed (S204: NO), the printer 1 subsequently carries out a second test item (TEST 2) on trial (S208). The second test item is a test as to whether simple authentication and association can be established with the second wireless access point 4 or not. As for a specific testing method, for example, the printer 1 transmits an authentication request packet to the second wireless access point 4, and receives an authentication response therefrom. In the case of a wireless LAN system in conformity with the IEEE 802.11 series standards, Open System authentication and Shard Key authentication (authentication using WEP) are defined as authentication systems in this stage. In addition, the printer 1 transmits an association request, and receives an association response.

The printer 1 then determines whether the result of TEST 2 carried out on trial is failed or not (S210). When it is concluded that the result is failed, it can be, for example, imagined that the WEP key is incorrect. When it is concluded that the result is failed (S210: YES), the printer 1 makes the RAM 12 store information indicating failure in TEST 2 (including information indicating success in TEST 1) (S212), and terminates the testing process.

On the contrary, when it is concluded that the result of TEST 2 carried out on trial is not failed (S210: NO), the printer 1 subsequently carries out a third test item (TEST 3) on trial (S214). The third test item is a test as to whether authentication can be established with the second wireless access point 4 or not. As for a specific testing method, for example, the authentication system set in the printer 1 has to coincide with the authentication system used by the second wireless access point 4, and the printer 1 cannot be authenticated if both the authentication systems do not coincide with each other. In order to be authenticated, the printer 1 transmits information such as a user ID and a password to the second wireless access point 4. The second wireless access point 4 receiving the information communicates with a RADIUS (Remote Authentication Dial In User Service) server (not shown) located on the network, and authenticates the printer 1 using the RADIUS server.

The printer 1 then determines whether the result of TEST 3 carried out on trial is failed or not (S216). When it is concluded that the result is failed, it can be, for example, imagined that the authentication system is incorrect, the user ID is incorrect, or the password is incorrect. When it is concluded that the result is failed (S216: YES), the printer 1 makes the RAM 12 store information indicating failure in TEST 3 (including information indicating success in TESTs 1 to 2) (S218), and terminates the testing process.

On the contrary, when it is concluded that the result of TEST 3 carried out on trial is not failed (S216: NO), the printer 1 subsequently carries out a fourth test item (TEST 4) on trial (S220). The fourth test item is a test as to whether a network address identical to that of the second wireless access point 4 has been set in the printer 1 or not. As for a specific testing method, for example, the printer 1 checks whether a PING (Packet InterNet Groper) response to a PING transmitted to a confirmation IP address can be received or not, whether a PING response to a PING transmitted to a gateway or a DNS server can be received or not, whether a transmission source IP address of a packet received as a PING response to a PING transmitted by broadcasting has a network address identical to the network address set in the printer 1 or not, or whether of devices monitored on the network, there is a device having a network address identical to the network address set in the printer 1 or not.

The printer 1 then determines whether the result of TEST 4 carried out on trial is failed or not (S222). When it is concluded that the result is failed, it can be, for example, imagined that the setting of the IP address is incorrect, the setting of a subnet mask is incorrect, and the setting of a gateway address is incorrect. When it is concluded that the result is failed (S222: YES), the printer 1 makes the RAM 12 store information indicating failure in TEST 4 (including information indicating success in TESTs 1 to 3) (S224), and terminates the testing process.

On the contrary, when it is concluded that the result of TEST 4 carried out on trail is not failed (S222: NO), the printer 1 makes the RAM 12 store information indicating success in all of TESTs 1 to 4 (S226), and terminates the testing process.

As a result of the testing process, some tests have been carried out, and data (test result data) indicating the test results have been stored in the RAM 12. The CPU 10 executing Steps S202 to S226 functions as the test unit.

Figure 5:
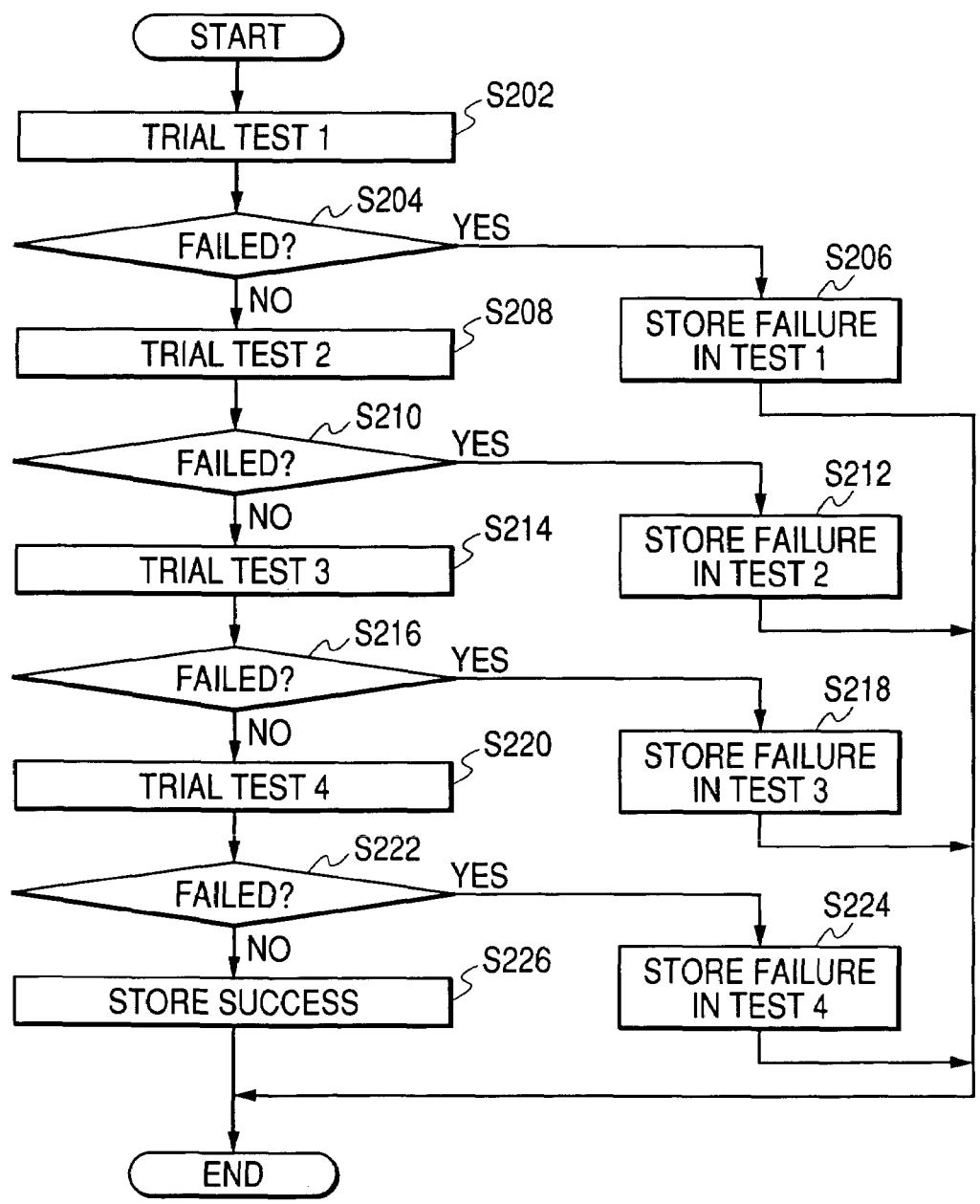
FIG. 5 is a flow chart showing a testing process to be executed by the printer in the first embodiment.

The termination of the testing process shown in FIG. 5 corresponds to the termination of Step S114 shown in FIG. 3. The printer 1 subsequently operates in accordance with the settings in the NVRAM 16 (S116). As described above, the first connection data have been stored in the NVRAM 16. Thus, when the CPU 10 controls the wireless I/F 20 in accordance with the first connection data, the printer 1 is restored to the state where the wireless connection between the printer 1 and the first wireless access point 2 has been established. On the other hand, the wireless connection between the printer 1 and the second wireless access point 4 is cut. The CPU 10 executing Step S116 functions as the return control unit.

Figure 6:
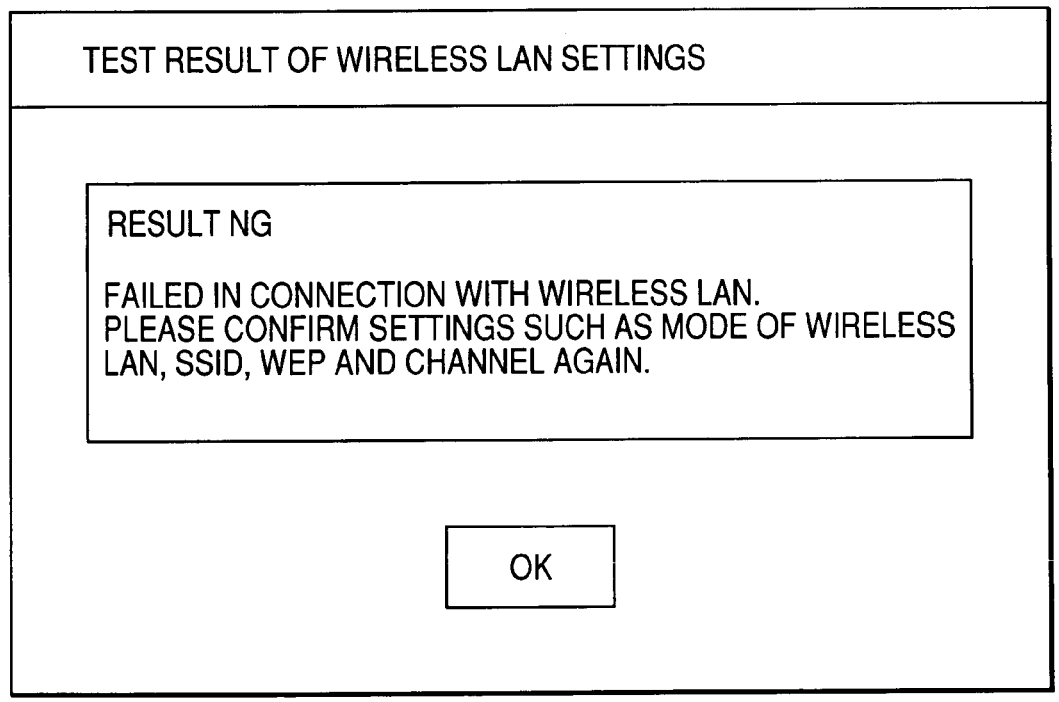
FIG. 6 is a diagram showing a pop-up window showing a result of testing executed by the printer in the first embodiment.

In this state, the printer 1 answers the test results to the first personal computer 3 as a client (S118). The test results are formed as data in the form of a Web page. A pop-up window as shown in FIG. 6 is displayed on the display portion 35 of the first personal computer 3.

The message displayed within the pop-up window has the contents that can make the user understand the stage of TEST 1 to TEST 4 where the testing was failed. Specifically, when the result of TEST 1 carried out on trial was failed (S204: YES), the item regarded as a factor of the failure is indicated by a message such as "Please check whether the power of the access point is turned on, whether the distance is too far or whether there is an obstruction", "Please check the setting of SSID", or "Please check the setting of the wireless channel". When the result of TEST 2 carried out on trial was failed (S210: YES), the fact of reaching at least the detection of the wireless access point is displayed by a message such as "Success in detecting the wireless access point", while the item regarded as a factor of the failure is displayed by a message such as "Please check the setting of WEP KEY". When the result of TEST 3 carried out on trial was failed (S216: YES), the fact of reaching at least success in wireless association is displayed by messages such as "Success in detecting the wireless access point" and "Success in wireless association", while the item regarded as a factor of the failure is displayed by a message such as "Please check the setting of the authentication method", "Please check the setting of the user ID", or "Please check the setting of the password". When the result of TEST 4 carried out on trial was failed (S222: YES), the fact of reaching at least success in wireless authentication is displayed by messages such as "Success in detecting the wireless access point", "Success in wireless association" and "Success in wireless authentication", while the item regarded as a factor of the failure is displayed by a message such as "Please check the setting of the IP address" or "Please check the setting of the subnet mask". Further, in the case of success in all of TEST 1 to TEST 4, success in all the test items is displayed by messages such as "Success in detecting the wireless access point", "Success in wireless association", "Success in wireless authentication" and "Success in IP access".

Accordingly, the user seeing the messages displayed on the display portion 35 of the first personal computer 3 and can confirm which wireless setting of the printer 1 has an error, and take measures such as changing a set value of each setting item if necessary. In addition, the messages indicating the test results can be printed using the printing portion 17 of the printer 1 (the CPU 10 executing the printing functions as the test result print control unit). When the test results are printed, necessary measures can be taken without any problem even if the messages displayed on the display portion 35 of the first personal computer 3 disappear for some trouble. When Step S118 is terminated, the process returns to Step S104. The CPU 10 executing Step S118 functions as the test result transmitting unit.

The wireless setting change command together with the TEST button push-down notification may be sent from the first personal computer 3.

When the command received by the printer 1 is not a TEST button push-down notification in Step S110 (S110: NO), the printer 1 subsequently checks whether the command is an "OK button push-down notification" or not (S120). The OK button push-down notification is a command transmitted from the first personal computer 3 to the printer 1 through the first wireless access point 2 when an "OK" button on the screen is pushed down in the state where the Web page shown in FIG. 4 is displayed on the display portion 35 of the first personal computer 3.

When the command received by the printer 1 is an OK button push-down notification in Step S120 (S120: YES), the settings stored in the RAM 12 are copied to the NVRAM 16 (S122), and the printer 1 operates in accordance with the settings in the NVRAM 16 (S124). The set values after the setting change have been stored in the RAM 12 due to Step S108 described previously. The updated set values include the second connection data. If the set values after the setting change are copied to the NVRAM 16, the set values after the setting change in this process will be used when Step S102 is carried out in the next time. On the other hand, control to change over the target of connection of the printer 1 from the first wireless access point 2 to the second wireless access point 4 is executed so that the wireless connection between the printer 1 and the first wireless access point 2 is cut. When Step S124 is terminated, the process returns to Step S104. On the other hand, when the command received by the printer 1 is not an OK button push-down notification in Step S120 (S120: NO), other processes are performed (S126), while the process returns to Step S104. The other processes include various processes instructed by commands other than the aforementioned commands. These processes are not directly concerned with a main portion of the invention, and detailed description thereof will be omitted.

Figure 7:
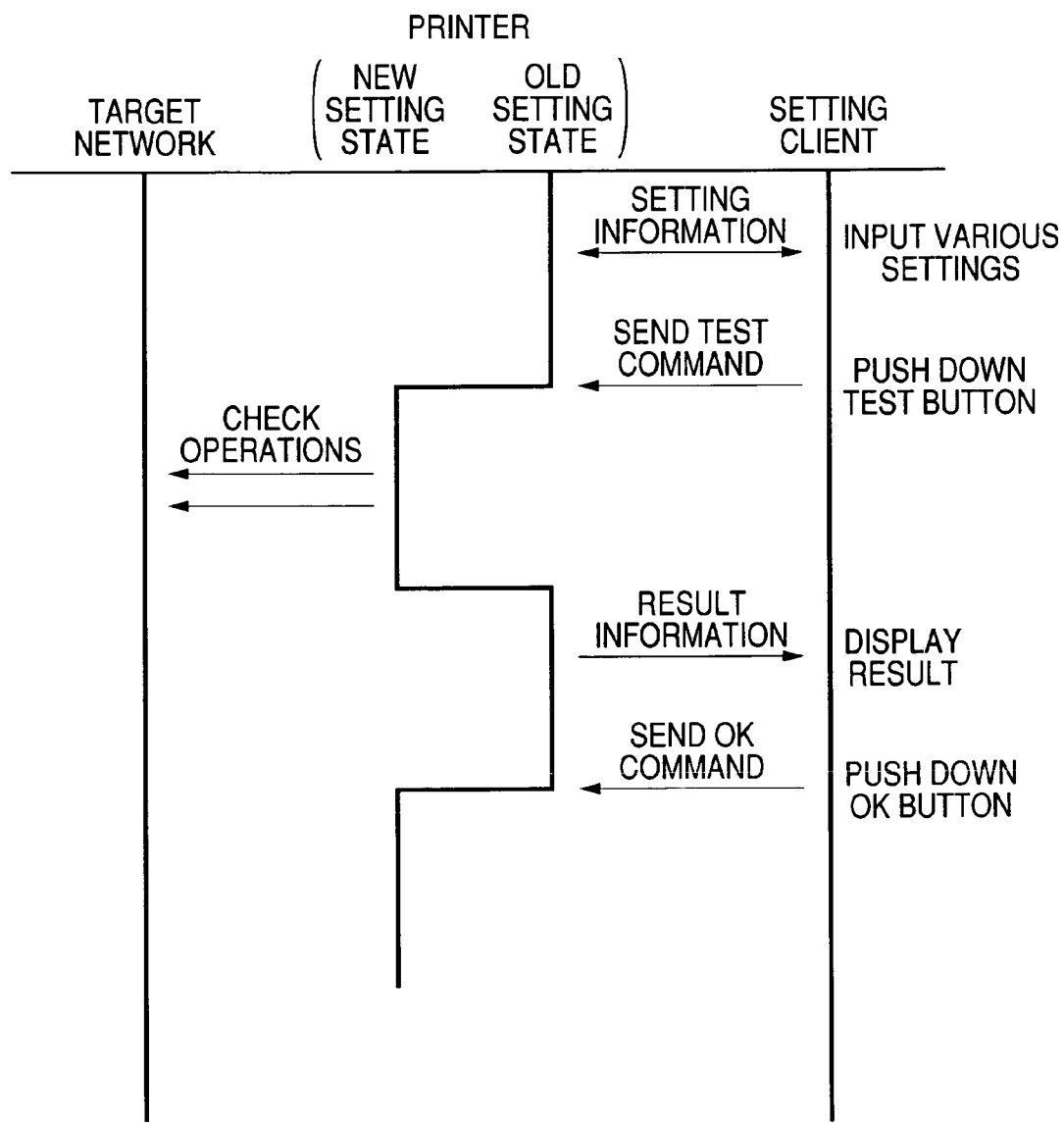
FIG. 7 is a timing chart showing the setting state/communication state of the printer in the first embodiment.

The printer 1 executing the aforementioned process operates as shown in the timing chart of FIG. 7.

First, the printer 1 is initially placed in an old setting state due to execution of Step S102. Accordingly, the printer 1 changes over to a state where the printer 1 can communicate with the first personal computer 3 as a setting client. In this event, when the user inputs various settings on the first personal computer 3 side, information of the settings is transmitted from the first personal computer 3 to the printer 1. Carrying out Steps S104-S108, the printer 1 receives the setting information.

When the user pushes down the TEST button on the first personal computer 3 side after the user terminates a series of settings, a TEST command is transmitted from the first personal computer 3 to the printer 1. Carrying out Steps S104 and S110, the printer 1 receives the TEST command. After that, the printer 1 carrying out Steps S112-S114 changes over from the old setting state to a new setting state once. In the new setting state, the printer 1 makes communication with a node (the second wireless access point 4 or the second personal computer 5) on the second network N2 side as a target network, so as to check operations.

After checking the operations, the printer 1 returns to the old setting state due to Steps S116-S118, and transmits result information (test result data) to the first personal computer 3. On the first personal computer 3 side, the result information is displayed on the display portion 35. Then, when the user pushes down the OK button on the first personal computer 3 side, an OK command is transmitted from the first personal computer 3 to the printer 1.

The printer 1 carrying out Steps S120-S124 changes over to the new setting state. After that, the printer 1 is kept connected to the second network N2 which is a target network.

As described above, when an instruction to try to control to change over a target of communication from the first wireless access point 2 to the second wireless access point 4 is received from the first personal computer 3 as a user's terminal via a network, the printer 1 configured thus is designed to change over to the state where communication between the printer 1 and the first personal computer 3 will be cut due to execution of the control, but the printer 1 can test beforehand as to whether the printer 1 can operate properly after the execution of the control or not, and the printer 1 can report information indicating the result of the testing to the first personal computer 3 via the network. Accordingly, the user can confirm the information reported by the printer 1 on the first personal computer 3 side. Thus, if necessary, the user can take measures such as reviewing the contents of the second connection data so as to allow the printer 1 to operate properly.

When the TEST button is pushed down on the first personal computer 3 side, the printer 1 carries out testing as to whether it is possible to make control to change over the target of communication or not. When the OK button is pushed down, the printer 1 executes the control to change over the target of communication actually. Accordingly, the user can determine whether to execute control to change over the target of communication from the first wireless access point 2 to the second wireless access point 4 after the user confirms the result of the testing, regardless of success/failure of the result of the testing.

Second Embodiment

Figure 8:
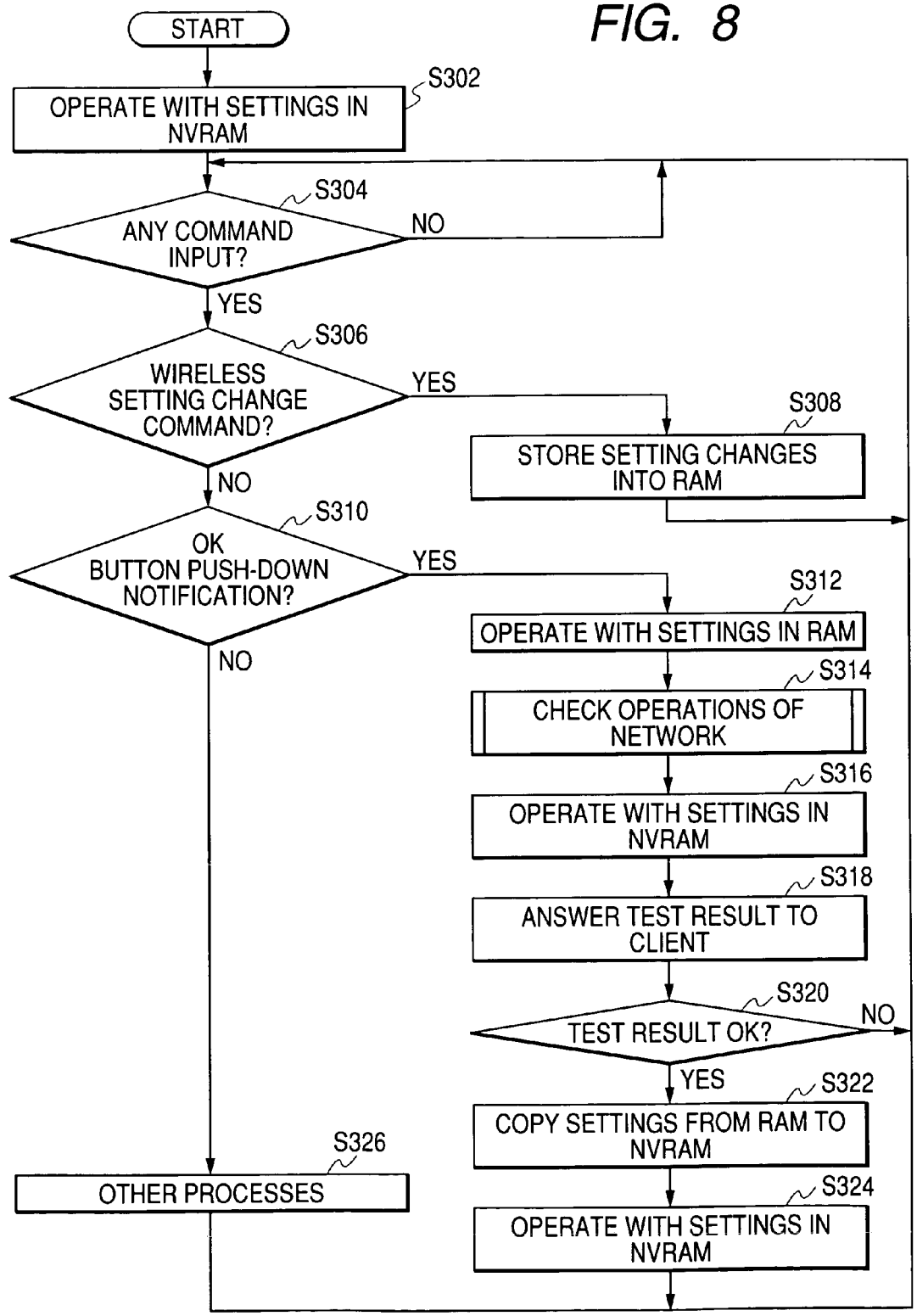
FIG. 8 is a flow chart showing a whole process to be executed by a printer in a second embodiment.

Next, description will be made on a second embodiment. A network apparatus which will be described as the second embodiment is a network printer similar to that in the first embodiment. Since the hardware configuration of the network printer is quite the same as that in the first embodiment, constituent members the same as those in the first embodiment are denoted by the same reference numerals correspondingly, and detailed description thereof will be omitted. The second embodiment is different from the first embodiment in a part of the process to be executed by the printer 1. The process to be executed by the printer 1 in the second embodiment will be described below with reference to the flow chart of FIG. 8. The process shown in FIG. 8 is a process to be executed by the printer 1 as soon as the power of the printer 1 is turned on.

When initiating the process, the printer 1 first operates in accordance with the settings in the NVRAM 16 (S302). As described in the first embodiment, set values of various items which can be set in the printer 1 have been stored in the NVRAM 16. Of the set values, some data (first connection data according to the invention) required for establishing connection with the first wireless access point 2 are included. Initially, wireless connection between the printer 1 and the first wireless access point 2 is established.

Next, the printer 1 waits for a command input via a network (S304: NO). When there is a command input via the network (S304: YES), the printer 1 checks whether the command is a "wireless setting change command" or not (S306). When the command received by the printer 1 is a wireless setting change command (S306: YES), changed settings are stored in the RAM 12 (S308). When Step S308 is terminated, the process returns to Step S304. Steps S304-S308 are similar to Steps S104-S108 in the first embodiment.

On the other hand, when the command received by the printer 1 is not a wireless setting change command in Step S306 (S306: NO), the printer 1 subsequently checks whether the command is an "OK button push-down notification" or not (S310). The OK button push-down notification is a command transmitted from the first personal computer 3 to the printer 1 via the first wireless access point 2 when an "OK" button on the screen is pushed down in the state where a Web page shown in FIG. 9 is displayed on the display portion 35 of the first personal computer 3.

When the command received by the printer 1 is an OK button push-down notification in Step S310 (S310: YES), the printer 1 operates in accordance with the settings in the RAM 12 (S312). As a result, control is executed to change over the target of connection of the printer 1 from the first wireless access point 2 to the second wireless access point 4. As a result of the control, the wireless connection between the printer 1 and the first wireless access point 2 is cut. In addition, in some contents of the set values updated in the aforementioned step, wireless connection between the printer 1 and the second wireless access point 4 can be established, but in some contents of the updated set values, the wireless connection between the both cannot be established. Further, even when the wireless connection between the both can be established, the printer 1 and the first personal computer 3 cannot communicate with each other because the first wireless access point 2 and the second wireless access point 4 are not connected to each other. In addition, in some case, the printer 1 may not take part in the network even when the wireless connection between the both can be established.

The operations of the network are therefore checked to test as to whether the wireless connection between the printer 1 and the second wireless access point 4 could be established or not and whether the printer 1 could be correctly connected to the network or not (S314). In particular, Step S314 is a process quite the same as the testing process shown in the flow chart of FIG. 5. The testing process was described in detail in the description of the first embodiment, and description thereof will be omitted here.

When Step S314 is terminated, the printer 1 operates in accordance with the settings in the NVRAM 16 (S316). As a result, the printer 1 is restored to the state where the wireless connection between the printer 1 and the first wireless access point 2 has been established. On the other hand, the wireless connection between the printer 1 and the second wireless access point 4 is cut.

In this state, the printer 1 answers the test results to the first personal computer 3 as a client (S318). The test results are formed as data in the form of a Web page. A pop-up window as shown in FIG. 6 is displayed on the display portion 35 of the first personal computer 3. Messages to be displayed within the pop-up window are similar to those in the first embodiment, and description thereof will be omitted here.

The wireless setting change command together with the OK button push-down notification may be sent from the first personal computer 3.

Next, it is checked whether the test results are successful or not (S320). When the test results are successful (S320: YES), the settings stored in the RAM 12 are copied to the NVRAM 16 (S322), and the printer 1 operates in accordance with the settings in the NVRAM 16 (S324). As a result, control to change over the target of connection of the printer 1 from the first wireless access point 2 to the second wireless access point 4 is executed so that the wireless connection between the printer 1 and the first wireless access point 2 is cut. After that, the set values after the setting change in this process will be used when Step S302 is carried out in the next time. When Step S324 is terminated, the process returns to Step S304. On the other hand, also when there is a problem in the test results in Step S320 (S320: NO), the process returns to Step S304.

When the command received by the printer 1 is not an OK button push-down notification in Step S310 (S310: NO), other processes are performed (S326), while the process returns to Step S304.

Figure 10:
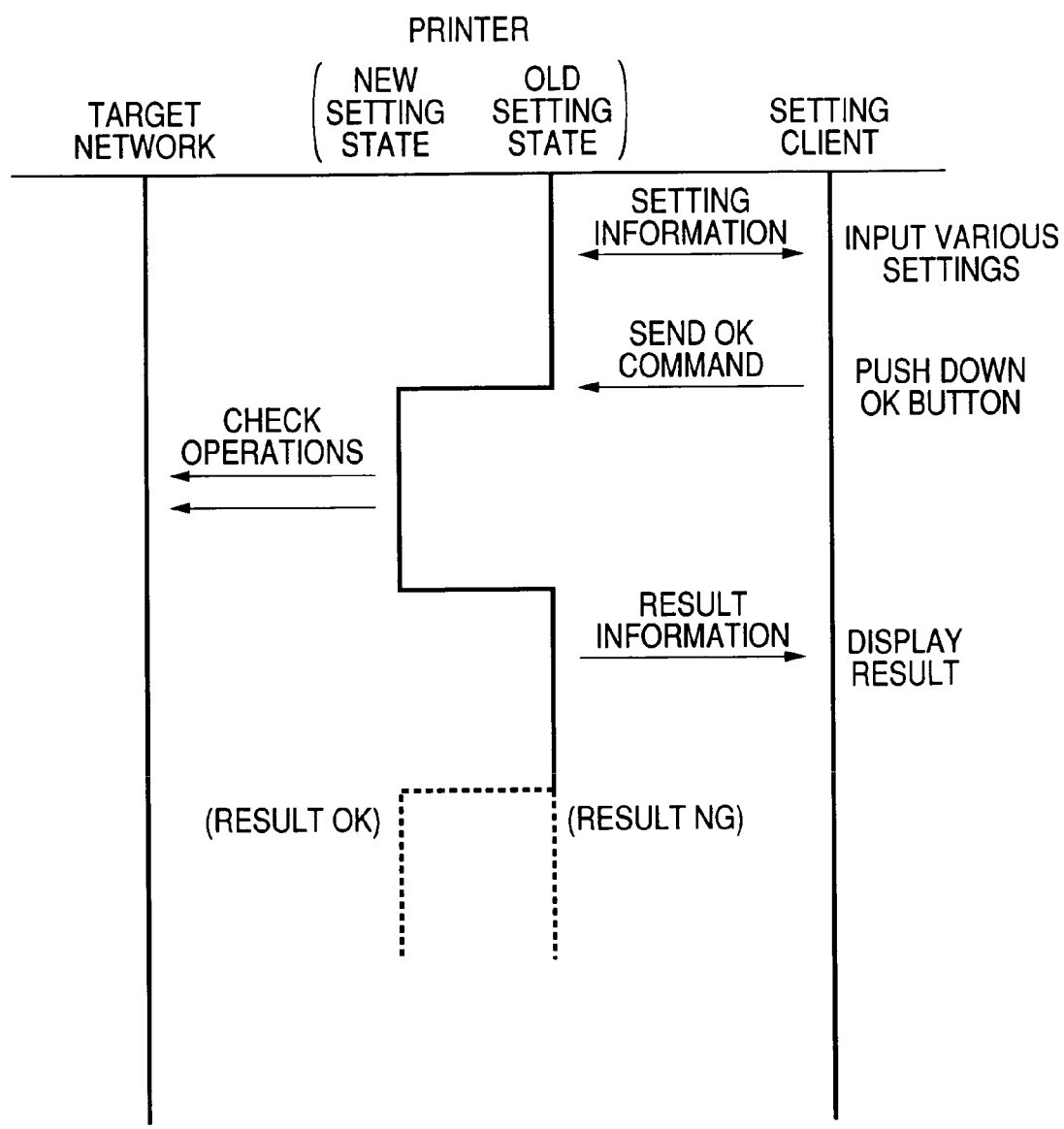
FIG. 10 is a timing chart showing the setting state/communication state of the printer in the second embodiment.

The printer 1 executing the aforementioned process operates as shown in the timing chart of FIG. 10.

First, the printer 1 is initially placed in an old setting state due to execution of Step S302. Accordingly, the printer 1 changes over to a state where the printer 1 can communicate with the first personal computer 3 as a setting client. In this event, when the user inputs various settings on the first personal computer 3 side, information of the settings is transmitted from the first personal computer 3 to the printer 1. Carrying out Steps S306-S308, the printer 1 receives the setting information.

When the user pushes down the OK button on the first personal computer 3 side after the user terminates a series of settings, an OK command is transmitted from the first personal computer 3 to the printer 1. Carrying out Steps S304 and S310, the printer 1 receives the OK command. After that, the printer 1 carrying out Steps S312-S314 changes over from the old setting state to a new setting state once. In the new setting state, the printer 1 makes communication with a node (the second wireless access point 4 or the second personal computer 5) on the second network N2 side as a target network, so as to check operations.

After checking the operations, the printer 1 returns to the old setting state due to Steps S316-S318, and transmits result information (test result data) to the first personal computer 3. On the first personal computer 3 side, the result information is displayed on the display portion 35.

After that, the printer 1 carrying out Steps S320-S324 changes over to the new setting state only when the test results are successful. After that, the printer 1 is kept connected to the second network N2 which is a target network (RESULT OK in FIG. 10). When there is a problem in the test results, the old setting state is maintained (RESULT NG in FIG. 10).

When an instruction to execute control to change over a target of communication from the first wireless access point 2 to the second wireless access point 4 is received from the first personal computer 3 as a user's terminal via a network, the printer 1 as described above is designed to change over to the state where communication between the printer 1 and the first personal computer 3 will be cut due to execution of the control, but the printer 1 can test beforehand as to whether the printer 1 can operate properly after the execution of the control or not, and the printer can report information indicating the result of the testing to the first personal computer 3 via the network. Accordingly, the user can confirm the information reported by the printer 1 on the first personal computer 3 side. Thus, if necessary, the user can take measures such as reviewing the contents of the second connection data so as to allow the printer 1 to operate properly.

When the OK button is pushed down on the first personal computer 3 side, the printer 1 carries out testing as to whether it is possible to make control to change over the target of communication or not. When the test result is successful, the printer 1 executes control to change over the target of communication from the first wireless access point 2 to the second wireless access point 4. Accordingly, the target of communication of the printer 1 can be changed over from the first wireless access point 2 to the second wireless access point 4 in a simpler operating procedure than that in the first embodiment in which the OK button is pushed down redundantly after the TEST button is pushed down.

When importance is attached to a simple operating procedure as described above, the configuration as in the second embodiment is desired. However, when the setting changes are not always applied directly in spite of a good test result, the configuration as in the first embodiment is desired. Therefore, which configuration to adopt depends on a matter as importance.

Third Embodiment

Next, a third embodiment will be described. A network apparatus which will be described as the third embodiment is also a network printer similar to that in the first or second embodiment. Since the hardware configuration of the network printer is quite the same as that in the first embodiment, constituent members the same as those in the first embodiment are denoted by the same reference numerals correspondingly, and detailed description thereof will be omitted.

The printer 1 according to the third embodiment can also arrange a network using a wireless LAN system in conformity with the IEEE 802.11 series standards in the same manner as in each embodiment described previously. The printer 1 is designed to serve as a wireless terminal in an infrastructure system wireless network so as to establish wireless connection with a wireless access point. In addition, though not referred to in each embodiment described previously, the printer 1 is also designed to serve as a wireless terminal in an ad hoc system wireless network so as to establish wireless connection with another wireless terminal. Whether the printer 1 takes part in an ad hoc system wireless network or an infrastructure system wireless network depends on setting of a communication mode stored in the printer 1. A set value in terms of the communication mode is included in the first connection data according to the invention.

Figure 11:
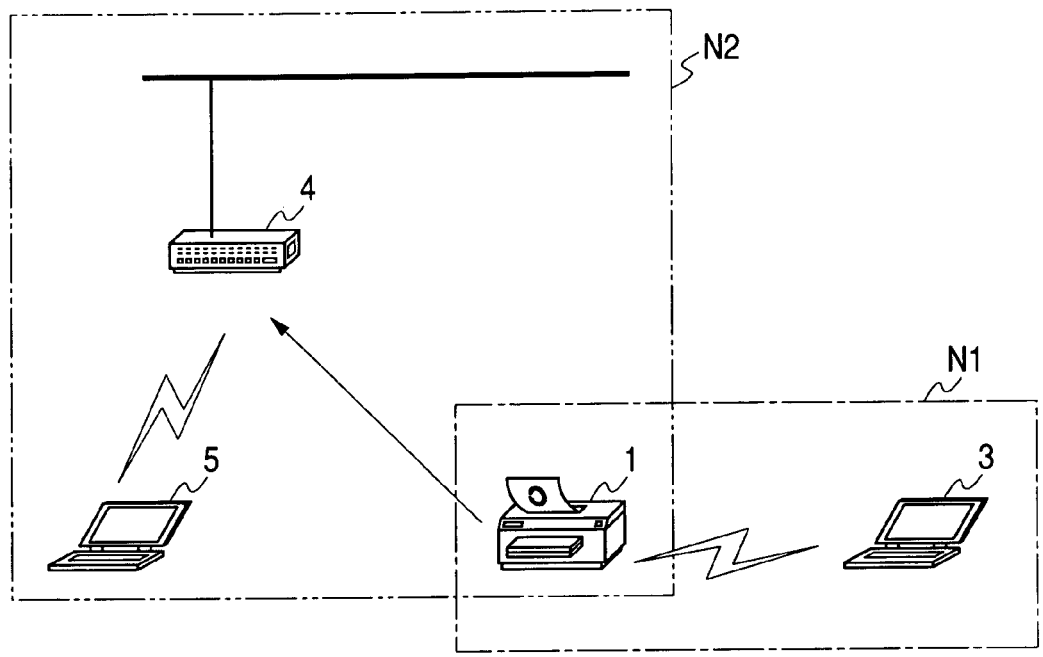
FIG. 11 is a configuration diagram showing a network in a third embodiment.

FIG. 11 is a diagram showing an example of a network in which the printer 1 is incorporated as a node. In FIG. 11, two independent systems, a first network N1 and a second network N2 are depicted. The first network N1 is a wireless network where the printer 1 and a first personal computer 3 serving as a wireless terminal communicate with each other in an ad hoc system. The second network N2 is a wireless network where the printer 1 and a second access point 4 communicate with each other in an infrastructure system. A second personal computer 5 making communication in the infrastructure system likewise is also connected to the second wireless access point 4 wirelessly. The printer 1 can select one alternatively from the aforementioned two systems of networks and set it as a target of connection.

The printer 1 configured thus has a difference from that in the first or second embodiment as to whether the communication channel with the first personal computer 3 is a communication channel allowing communication via the first wireless access point 2 in the infrastructure system (first or second embodiment) or a communication channel allowing communication directly in the ad hoc system (third embodiment). Nevertheless, the printer 1 is quite the same as that in the first or second embodiment in view of the point that the printer 1 can establish connection with only one of the two networks alternatively and the point that connection with the other is cut when the connection with the one is established.

Accordingly, when an instruction to execute or try to control to change over a target of communication from the first personal computer 3 to the second wireless access point 4 is received from the first personal computer 3 as a user's terminal via a network, the printer 1 configured thus is also designed to change over to the state where communication between the printer 1 and the first personal computer 3 will be cut due to execution of the control, but by executing the process described just as in the first or second embodiment, the printer 1 can test beforehand as to whether the printer 1 can operate properly after the execution of the control or not, and the printer 1 can report information indicating the result of the testing to the first personal computer 3 via the network. Accordingly, the user can confirm the information reported by the printer 1 on the first personal computer 3 side. Thus, if necessary, the user can take measures such as reviewing the contents of the second connection data so as to allow the printer 1 to operate properly.

Fourth Embodiment

Next, a fourth embodiment will be described. A network apparatus which will be described as the fourth embodiment is a network printer similar to that in the first to third embodiments. Since the hardware configuration of the network printer is quite the same as that in the first embodiment, constituent members the same as those in the first embodiment are denoted by the same reference numerals correspondingly, and detailed description thereof will be omitted.

The printer 1 according to the fourth embodiment can also arrange a network using a wireless LAN system in conformity with the IEEE 802.11 series standards in the same manner as in each embodiment described previously. The printer 1 is designed to serve as a wireless terminal in an infrastructure system wireless network so as to establish wireless connection with a wireless access point. In addition, the printer 1 is also designed to serve as a wireless terminal in an ad hoc system wireless network so as to establish wireless connection with another wireless terminal. Whether the printer 1 takes part in an ad hoc system wireless network or an infrastructure system wireless network depends on setting of a communication mode stored in the printer 1. A set value in terms of the communication mode is included in the first connection data according to the invention.

Figure 12:
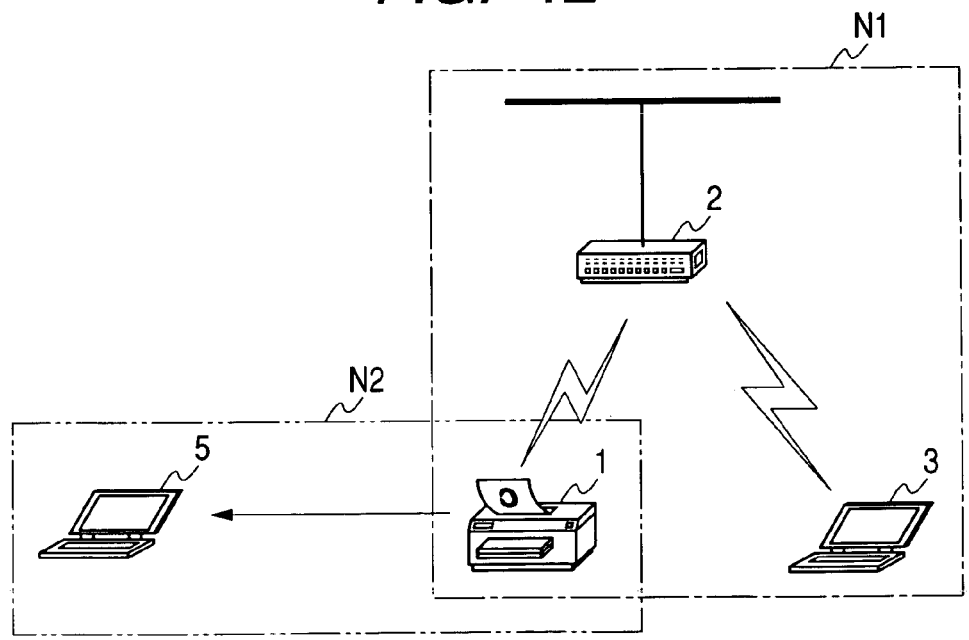
FIG. 12 is a configuration diagram showing a network in a fourth embodiment.

FIG. 12 is a diagram showing an example of a network in which the printer 1 is incorporated as a node. In FIG. 12, two independent systems, a first network N1 and a second network N2 are depicted. The first network N1 is a wireless network where the printer 1 and a first wireless access point 2 communicate with each other in an infrastructure system. A first personal computer 3 making communication in the infrastructure system likewise is also connected to the first wireless access point 2 wirelessly. The second network N2 is a wireless network where the printer 1 and a second personal computer 5 serving as a wireless terminal communicate with each other in an ad hoc system. The printer 1 can select one alternatively from the aforementioned two systems of networks and set it as a target of connection.

The printer 1 configured thus has a difference from that in the first or second embodiment as to whether the communication channel with the second personal computer 5 is a communication channel allowing communication via the second wireless access point 4 in the infrastructure system (first or second embodiment) or a communication channel allowing communication directly in the ad hoc system (fourth embodiment). Nevertheless, the printer 1 is quite the same as that in the first or second embodiment in view of the point that the printer 1 can establish connection with only one of the two networks alternatively and the point that that connection with the other is cut when the connection with the one is established.

Accordingly, when an instruction to execute or try to control to change over a target of communication from the first wireless access point 2 to the second personal computer 5 is received from the first personal computer 3 as a user's terminal via a network, the printer 1 configured thus is also designed to change over to the state where communication between the printer 1 and the first personal computer 3 will be cut due to execution of the control, but by executing the process described just as in the first or second embodiment, the printer 1 can test beforehand as to whether the printer 1 can operate properly after the execution of the control or not, and the printer 1 can report information indicating the result of the testing to the first personal computer 3 via the network. Accordingly, the user can confirm the information reported by the printer 1 on the first personal computer 3 side. Thus, if necessary, the user can take measures such as reviewing the contents of the second connection data so as to allow the printer 1 to operate properly.

Fifth Embodiment

Next, a fifth embodiment will be described. A network apparatus which will be described as the fifth embodiment is a network printer similar to that in the first or second embodiment. Since the hardware configuration of the network printer is quite the same as that in the first embodiment, constituent members the same as those in the first embodiment are denoted by the same reference numerals correspondingly, and detailed description thereof will be omitted.

The printer 1 according to the fifth embodiment can also arrange a network using a wireless LAN system in conformity with the IEEE 802.11 series standards in the same manner as in each embodiment described previously. The printer 1 is designed to serve as a wireless terminal in an ad hoc system wireless network so as to establish wireless connection with another wireless terminal in the same manner as in the third or fourth embodiment.

Figure 13:
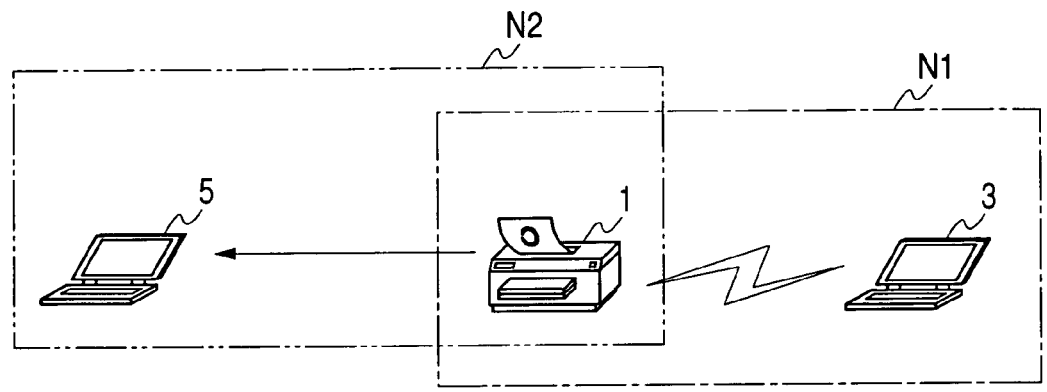
FIG. 13 is a configuration diagram showing a network in a fifth embodiment.

FIG. 13 is a diagram showing an example of a network in which the printer 1 is incorporated as a node. In FIG. 13, two independent systems, a first network N1 and a second network N2 are depicted. The first network N1 is a wireless network where the printer 1 and a first personal computer 3 serving as a wireless terminal communicate with each other in an ad hoc system. The second network N2 is a wireless network where the printer 1 and a second personal computer 5 serving as a wireless terminal communicate with each other in an ad hoc system. The printer 1 can select one alternatively from the aforementioned two systems of networks and set it as a target of connection.

In the printer 1 configured thus, the communication channel with the first personal computer 3 has a configuration similar to that in the third embodiment, and the communication channel with the second personal computer 5 has a configuration similar to that in the fourth embodiment. Nevertheless, the printer 1 is quite the same as that in each aforementioned embodiment in view of the point that the printer 1 can establish connection with only one of the two networks alternatively and the point that connection with the other is cut when the connection with the one is established.

Accordingly, when an instruction to execute or try to control to change over a target of communication from the first personal computer 3 to the second personal computer 5 is received from the first personal computer 3 as a user's terminal via a network, the printer 1 configured thus is also designed to change over to the state where communication between the printer 1 and the first personal computer 3 will be cut due to execution of the control, but by executing the process described just as in the first or second embodiment, the printer 1 can test beforehand as to whether the printer 1 can operate properly after the execution of the control or not, and the printer 1 can report information indicating the result of the testing to the first personal computer 3 via the network. Accordingly, the user can confirm the information reported by the printer 1 on the first personal computer 3 side. Thus, if necessary, the user can take measures such as reviewing the contents of the second connection data so as to allow the printer 1 to operate properly.

Sixth Embodiment

Next, description will be made on a sixth embodiment. A network apparatus which will be described as the sixth embodiment is also a network printer (hereinafter referred to as "printer") which can arrange a network using a wireless LAN system in conformity with the IEEE 802.11 series standards and which is designed to receive print data transmitted from another network apparatus and print the print data.

More in particular, the printer is designed to serve as a wireless terminal in an infrastructure system wireless network so as to establish wireless connection with a wireless access point in the same manner as in each aforementioned embodiment. The print data are transmitted from the aforementioned other network apparatus to the printer via the wireless access point. In addition, the printer is designed as a complex machine having an image scanner function, a facsimile function, a copying machine function, etc. as well as the aforementioned network printer function. This point is also the same as in each aforementioned embodiment.

In addition, the printer is different from that in each aforementioned embodiment in the point that the printer can serve as an access point in an infrastructure system wireless network so as to establish wireless connection with a wireless terminal.

Figure 14:
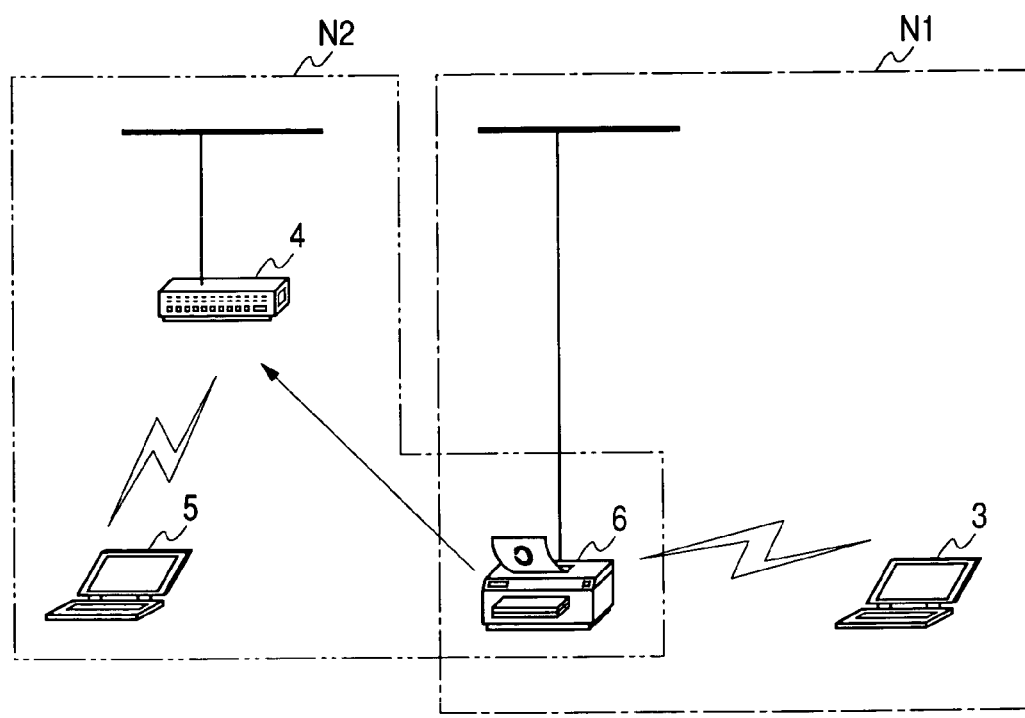
FIG. 14 is a configuration diagram showing a network in a sixth embodiment.

FIG. 14 is a diagram showing an example of a network in which a printer 6 functions as the network apparatus is incorporated as a node. In FIG. 14, two independent systems, a first network N1 and a second network N2 are depicted. The printer 6 is cable-connected to the first network N1 through a LAN cable. When the printer 6 serves as an access point, a first personal computer 3 serving as a wireless terminal establishes wireless connection with the printer 6. Thus, the first personal computer 3 also becomes a node of the first network N1. A second wireless access point 4 and a second personal computer 5 serving as a wireless terminal are connected to the second network N2.

Figure 15:
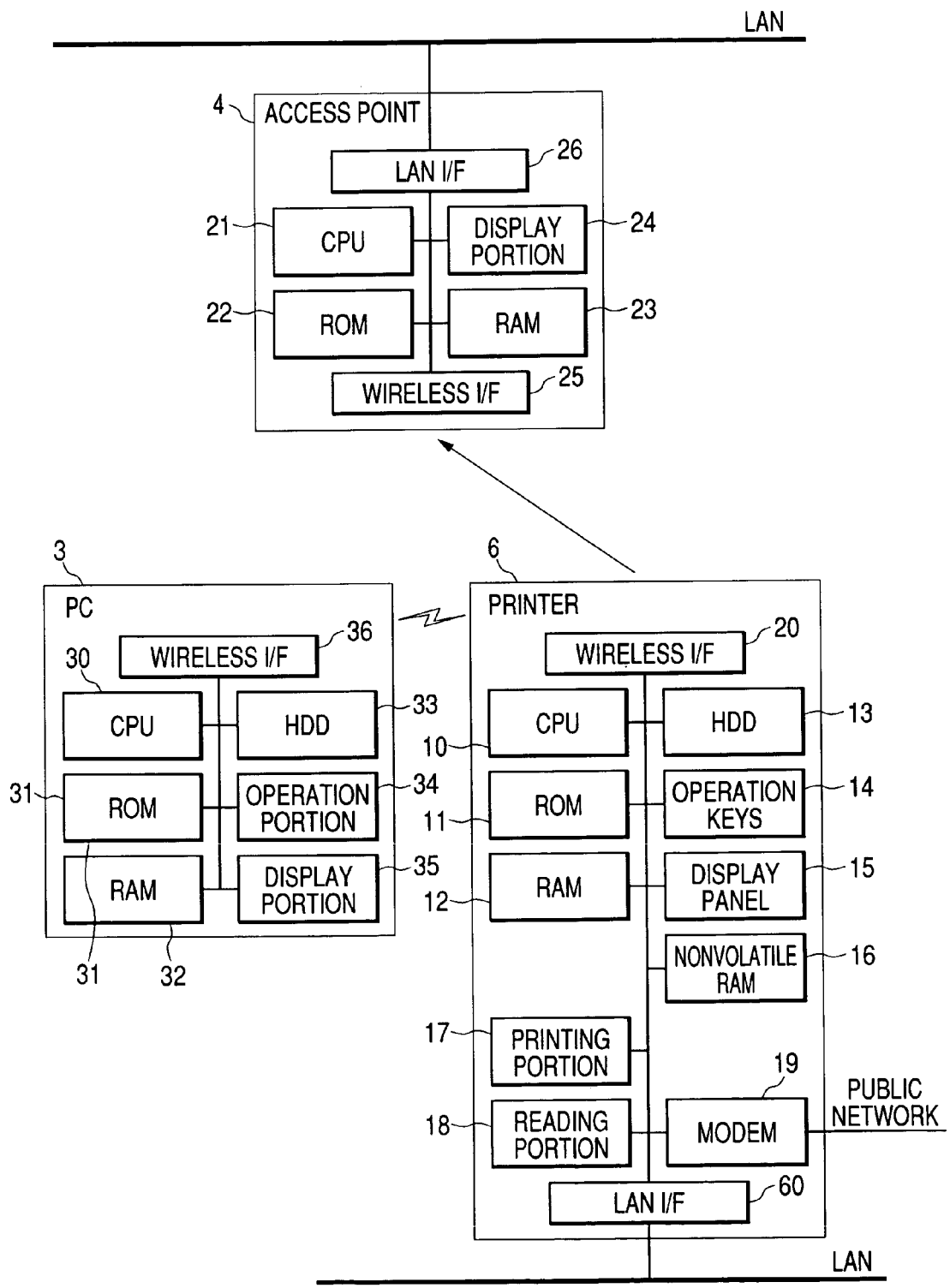
FIG. 15 is a configuration diagram showing the internal configuration of each device constituting the network in the sixth embodiment.

FIG. 15 is a configuration diagram showing the internal configurations of the printer 6, the second wireless access point 4 and the first personal computer 3.

The printer 6 has a CPU 10, a ROM 11, a RAM 12, a hard disk drive (HDD) 13, operation keys 14, a display panel 15, a nonvolatile RAM (NVRAM) 16, a printing portion 17, a reading portion 18, a modem 19, a wireless interface portion (wireless I/F) 20, a LAN interface portion (LAN I/F) 60, etc. The LAN I/F 60 is connected to the cable network through a LAN cable so as to enable data communication with a network apparatus on the cable network. The printer 6 has a hardware configuration equivalent to that of the printer 1 described in the previous embodiments, except the existence of the LAN I/F 60. Constituent members similar to those in the previous embodiments are denoted by the same reference numerals correspondingly, and detailed description thereof will be omitted.

In addition, the first personal computer 3 has a configuration just as described in the previous embodiments, and the second wireless access point 4 is equivalent to the first wireless access point 2 described in the previous embodiments. These members are also denoted by the same reference numerals as those in the previous embodiments, and detailed description thereof will be omitted.

In the printer 6 configured thus, the CPU 10 controls the wireless I/F 20 or the other portions in accordance with control programs stored in the ROM 11 while changing over a control mode between a first control mode for making the printer 6 serve as a wireless access point and a second control mode for making the printer 6 serve as a wireless terminal. Thus, the printer 6 serves as an access point in the first control mode so that wireless connection with the first personal computer 3 serving as a wireless terminal can be established in an infrastructure system. On the other hand, in the second control mode, the printer 6 serves as a wireless terminal so that wireless connection with the second wireless access point 4 can be established in an infrastructure system. In the second control mode, cable connection through the LAN I/F 60 is canceled so that the cable connection of the printer 6 with the first network N1 is cut.

In comparison with the first or second embodiment, the printer 6 configured thus has a difference as to whether the wireless communication channel with the first personal computer 3 is a communication channel formed with the printer 1 serving as a wireless terminal so as to allow communication via the first wireless access point 2 (first or second embodiment) or a communication channel formed with the printer 6 serving as a wireless access point so as to allow direct communication with a wireless terminal (sixth embodiment). Nevertheless, the printer 6 is quite the same as the printer 1 in the first or second embodiment in view of the system with which a wireless communication channel with the second personal computer 5 is established, the point that the printer 6 can establish connection with only one of the two networks alternatively and the point that connection with the other is cut when the connection with the one is established.

Accordingly, when an instruction to execute or try to control to change over a target of communication from the first personal computer 3 to the second wireless access point 4 is received from the first personal computer 3 as a user's terminal via a network, the printer 6 configured thus is also designed to change over to the state where communication between the printer 6 and the first personal computer 3 will be cut due to execution of the control, but by executing the process described just as in the first or second embodiment, the printer 6 can test beforehand as to whether the printer 6 can operate properly after the execution of the control or not, and the printer 6 can report information indicating the result of the testing to the first personal computer 3 via the network. Accordingly, the user can confirm the information reported by the printer 6 on the first personal computer 3 side. Thus, if necessary, the user can take measures such as reviewing the contents of the second connection data so as to allow the printer 6 to operate properly.

Seventh Embodiment

Next, description will be made on a seventh embodiment. A network apparatus which will be described as the seventh embodiment is a printer similar to that in the sixth embodiment. Since the hardware configuration of the printer is quite the same as that in the sixth embodiment, constituent members the same as those in the sixth embodiment are denoted by the same reference numerals correspondingly, and detailed description thereof will be omitted.

The printer 6 according to the seventh embodiment can arrange a network using a wireless LAN system in conformity with the IEEE 802.11 series standards in the same manner as in the sixth embodiment described previously. The printer 6 is designed to serve as a wireless terminal in an infrastructure system wireless network so as to establish wireless connection with a wireless access point. In addition, the printer 6 can also serve as an access point in an infrastructure system wireless network so as to establish wireless connection with a wireless terminal.

Figure 16:
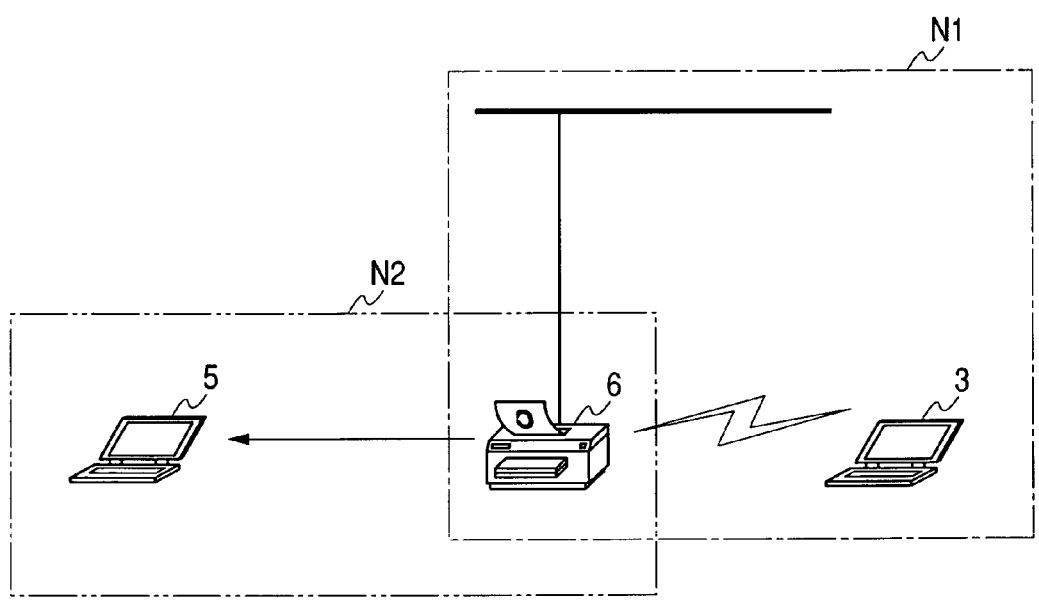
FIG. 16 is a configuration diagram showing a network in a seventh embodiment.

FIG. 16 is a diagram showing an example of a network in which the printer 6 is incorporated as a node. In FIG. 16, two independent systems, a first network N1 and a second network N2 are depicted. The printer 6 is cable-connected to the first network N1 through a LAN cable. When the printer 6 serves as an access point, a first personal computer 3 serving as a wireless terminal establishes wireless connection with the printer 6. Thus, the first personal computer 3 also becomes a node of the first network N1. The second network N2 is a wireless network in which the printer 6 and a second personal computer 5 serving as a wireless terminal communicate with each other in an ad hoc system.

As described in the sixth embodiment, the printer 6 serves as an access point in a first control mode so that wireless connection with the first personal computer 3 serving as a wireless terminal can be established in an infrastructure system. On the other hand, in a second control mode, the printer 6 serves as a wireless terminal so that wireless connection with the second wireless access point 4 can be established in an infrastructure system. In the second control mode, cable connection through the LAN I/F 60 is canceled so that the cable connection of the printer 6 with the first network N1 is cut.

In comparison with the fourth embodiment, the printer 6 configured thus has a difference as to whether the wireless communication channel with the first personal computer 3 is a communication channel formed with the printer 1 serving as a wireless terminal so as to allow communication via the first wireless access point 2 (fourth embodiment) or a communication channel formed with the printer 6 serving as a wireless access point so as to allow direct communication with a wireless terminal (seventh embodiment). Nevertheless, the printer 6 is quite the same as the printer 1 in the fourth embodiment in view of the system with which a wireless communication channel with the second personal computer 5 is established, the point that the printer 6 can establish connection with only one of the two networks alternatively and the point that connection with the other is cut when the connection with the one is established.

Accordingly, when an instruction to execute or try to control to change over a target of communication from the first personal computer 3 to the second wireless access point 4 is received from the first personal computer 3 as a user's terminal via a network, the printer 6 configured thus is also designed to change over to the state where communication between the printer 6 and the first personal computer 3 will be cut due to execution of the control, but by executing the process described just as in the first or second embodiment, the printer 6 can test beforehand as to whether the printer 6 can operate properly after the execution of the control or not, and the printer 6 can report information indicating the result of the testing to the first personal computer 3 via the network. Accordingly, the user can confirm the information reported by the printer 6 on the first personal computer 3 side. Thus, if necessary, the user can take measures such as reviewing the contents of the second connection data so as to allow the printer 6 to operate properly.

Eighth Embodiment

Next, description will be made on an eighth embodiment. A network apparatus which will be described as the eighth embodiment is a network printer similar to that in the first embodiment. Since the hardware configuration of the printer is quite the same as that in the first embodiment, constituent members the same as those in the first embodiment are denoted by the same reference numerals correspondingly, and detailed description thereof will be omitted. There is a difference from the first embodiment in the display form of a Web page to be displayed on the display portion 35 of the first personal computer 3 and a part of a process to be executed by the printer 1.

First, description will be made on the Web page to be displayed on the display portion 35 of the first personal computer 3. Also in this embodiment, a list of setting items about wireless settings of the printer 1 is provided by the printer 1 in the form of a Web page. For example, when a user uses a browser in the first personal computer 3 and issues a request for distribution of the Web page to the printer 1, the printer 1 serves as a Web server such that a Web page as shown in FIG. 17 is displayed on the display portion 35 of the first personal computer 3.

The Web page is a page in which a "TEST RESULT" button has been added to the Web page shown in FIG. 4. When the user pushes down the "TEST RESULT" button, the first personal computer 3 transmits, to the printer 1, a command to transmit the test result described in the first embodiment.

Figure 18:
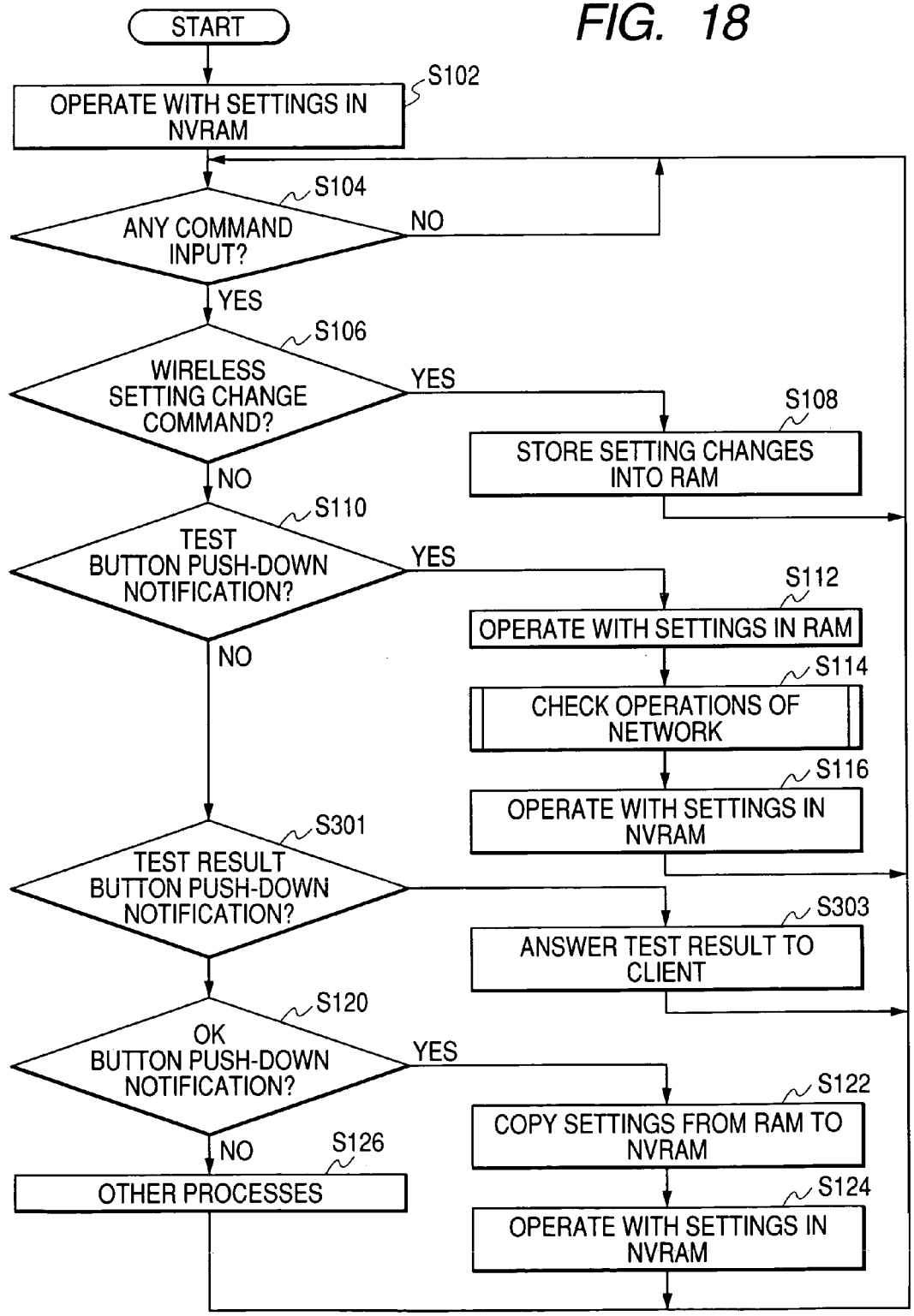
FIG. 18 is a flow chart showing a whole process to be executed by a printer in the eighth embodiment.

Next, the process to be executed by the printer 1 according to this embodiment will be described with reference to the flow chart of FIG. 18. The process shown in FIG. 18 is a process to be executed by the printer 1 as soon as the power of the printer 1 is turned on. The flow chart includes steps similar to Steps S102-S116 and S120-S126 in the flow chart shown in FIG. 3, and description about those steps will be omitted.

In the flow chart shown in FIG. 18 in the eighth embodiment, whether an input command is a "TEST RESULT button push-down notification" or not is checked (S301) before checking whether the command is an "OK button push-down notification" or not (S120) when the command is not a "TEST button push-down notification" (S110: NO) as a result of Step S110 checking whether the command is a "TEST button push-down notification" or not. When the command is a "TEST RESULT button push-down notification" in Step 301, the process proceeds to Step S303. When the command is not a "TEST RESULT button push-down notification" (S301: NO), the process proceeds to Step S120. In Step 303, the printer 1 transmits a test result to the first personal computer 3 as a client (S303).

Figure 19:
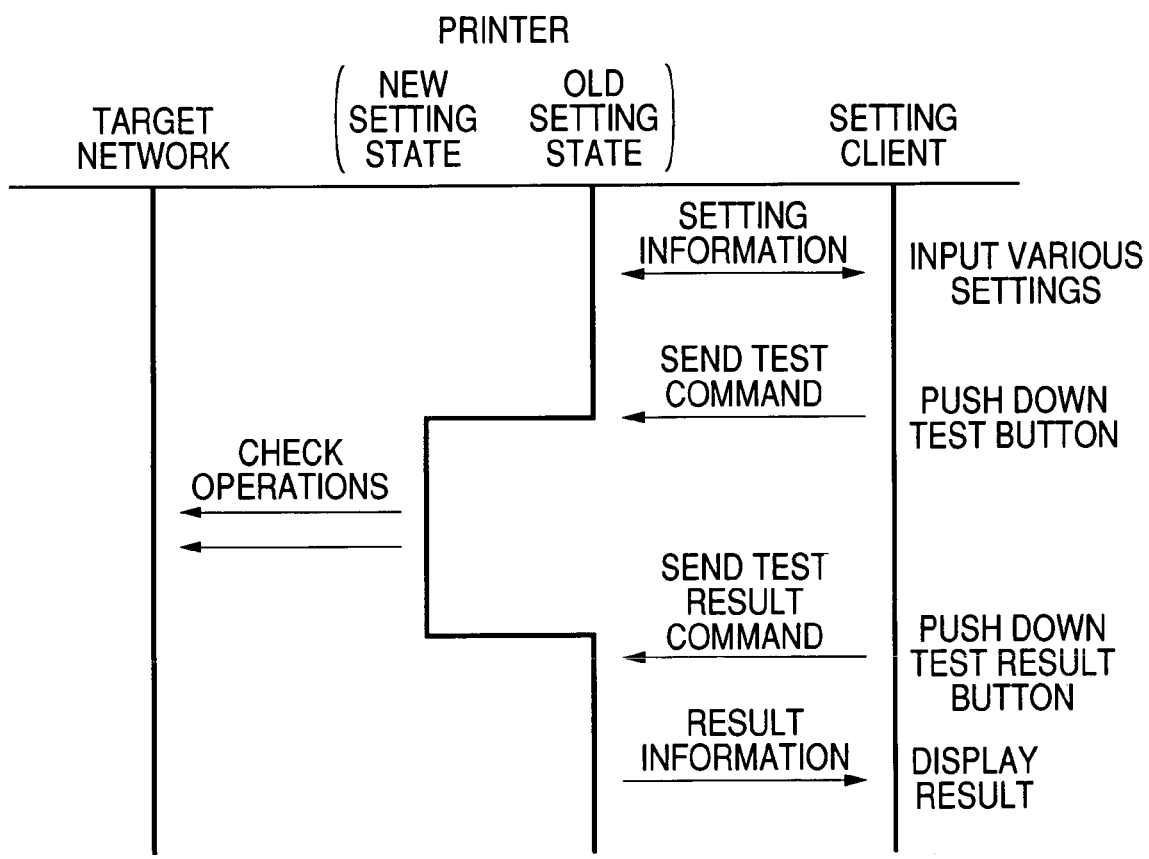
FIG. 19 is a timing chart showing the setting state/communication state of the printer in the eighth embodiment.

The printer 1 carrying out the aforementioned process operates as shown in the timing chart of FIG. 19. In the first embodiment, the printer 1 communicates with a node (the second wireless access point 4 or the second personal computer 5) on the second network N2 side, and performs checking of operations. After that, the printer 1 transmits the result information (test result data) of the checking to the first personal computer 3. According to this embodiment, however, the printer 1 transmits result information to the first personal computer 3 when the printer 1 receives the TEST RESULT command. The result information is displayed on the display portion 35 on the first personal computer 3 side. All but the aforementioned process is quite the same as that in the first embodiment, and description thereof will be omitted.

Ninth Embodiment

Next, description will be made on a ninth embodiment. A network apparatus which will be described as the ninth embodiment is a network printer similar to that in the first embodiment. Since the hardware configuration of the printer is quite the same as that in the first embodiment, constituent members the same as those in the first embodiment are denoted by the same reference numerals correspondingly, and detailed description thereof will be omitted. In the aforementioned embodiment, set values of setting items about wireless settings of the printer 1 are changed from the first personal computer 3 via the first wireless access point 2. In this embodiment, however, the user directly operates the operation keys 14 of the printer 1 so as to change the set values stored in the RAM 12. The result of operation using the operation keys 14 is displayed on the display panel 15. When an EXIT button displayed on the display panel 15 is pushed down, the printer 1 performs testing based on changed set values. Although the result of testing performed by the printer 1 is transmitted to the first personal computer 3 in the aforementioned embodiments, the result is displayed on the display panel 15 of the printer 1 in this embodiment.

Figure 20:
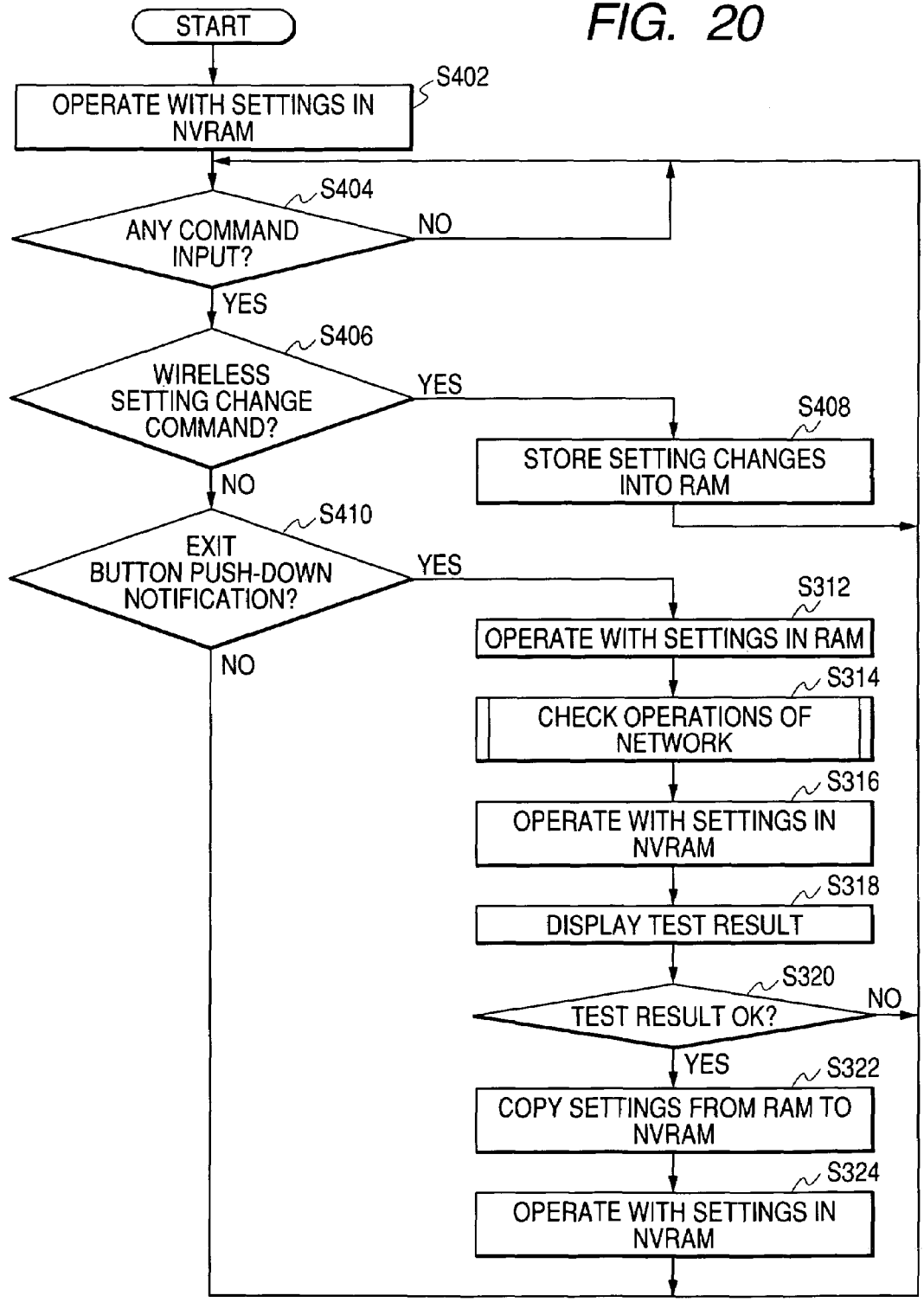
FIG. 20 is a flow chart showing a whole process to be executed by a printer in a ninth embodiment.

Next, the process to be executed by the printer 1 according to this embodiment will be described with reference to the flow chart of FIG. 20. The process shown in FIG. 20 is a process to be executed by the printer 1 as soon as the power of the printer 1 is turned on.

When the process is initiated, the printer 1 first operates in accordance with settings in the NVRAM 16 (S402). As described in the first embodiment, set values of various items that can be set in the printer 1 have been stored in the NVRAM 16. The set values include some data (first connection data according to the invention) required for establishing connection with the first wireless access point 2. Accordingly, wireless connection between the printer 1 and the first wireless access point 2 is established initially.

Next, the printer 1 waits for a command input from the operation keys 14 (S404: NO). When there is a command input (S404: YES), the printer 1 checks whether the command is a "wireless setting change command" or not (S406). When the command received by the printer 1 is a wireless setting change command (S406: YES), changed settings are stored in the RAM 12 (S408). When Step S408 is terminated, the process returns to Step S404.

On the other hand, when the command received by the printer 1 is not a wireless setting change command in Step S406 (S406: NO), the printer 1 subsequently checks whether "EXIT button push-down" is present or not (S410). The following operation is similar to that in Steps S312-S324 shown in FIG. 8, and description thereof will be omitted. The test result is displayed on the display panel 15 of the printer 1 as described above.

Figure 21:
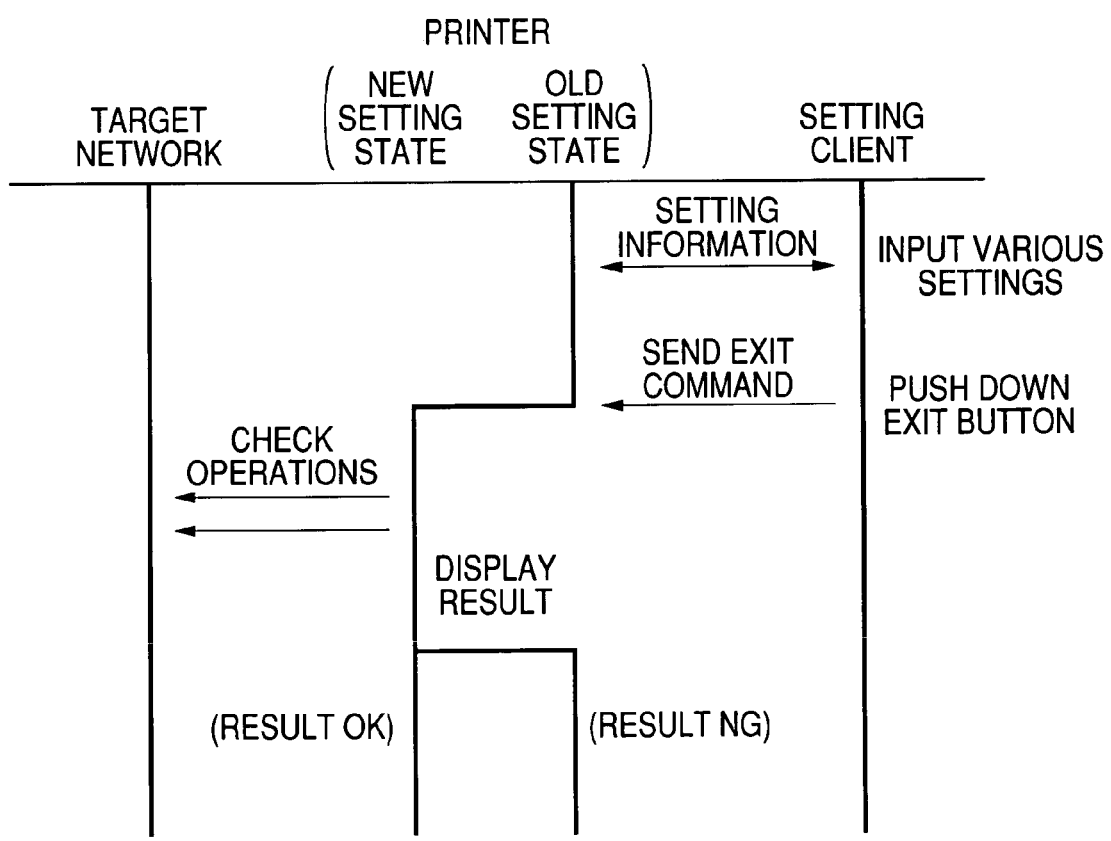
FIG. 21 is a timing chart showing the setting state/communication state of the printer in the ninth embodiment.

The printer 1 executing the aforementioned process operates as shown in the timing chart of FIG. 21. The timing chart is substantially similar to the timing chart shown in FIG. 10, except that changing the setting information or pushing down the EXIT button is performed by the user's operation on the operation panel 14 of the printer 1. In addition, after the test result is displayed on the display panel 15, the printer 1 is changed over to a new setting state (RESULT OK in FIG. 21) when there is no problem in the test result. When there is a problem in the test result, the old setting state is maintained (RESULT NG in FIG. 21).

Figure 22:
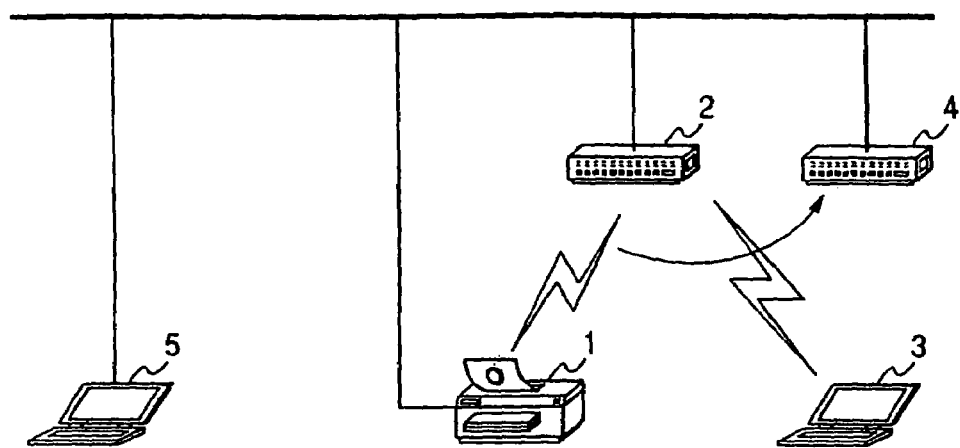
FIG. 22 is another configuration diagram showing a network in the ninth embodiment.

Although an example in which the first personal computer 3 is connected to a network wirelessly in the aforementioned embodiment, the first personal computer 3 may be connected to the network by cable as shown in FIG. 22. In addition, the printer 1 may be connected to a network both wirelessly and by cable as shown in FIG. 22.

Other Embodiments

Although description was made on the embodiments of the invention, the invention is not limited to any specific one of the embodiments. The invention can be carried out in various forms other than the embodiments.

For example, each aforementioned embodiment shows a wireless LAN in conformity with the IEEE 802.11 series standards, by which wireless connection is established in an infrastructure system or an ad hoc system. However, the wireless network standards are not limited especially. The configuration of the invention may be applied to any case in which there are two systems of networks where connection with one network will be cut when connection with the other network is established, and settings of a network apparatus are changed from a user's terminal taking part in the one network so as to change over a target of connection of the network apparatus.

Although a network printer is shown as an example of the network apparatus according to the invention in the aforementioned embodiments, it is optional whether the network apparatus has a function as a printer or not. For example, the network apparatus may be a personal computer, an image scanner or another network instrument that can take part in a network as a wireless terminal. Alternatively, the network apparatus may be a network instrument that can take part in a network as an access point. As shown in the sixth or seventh embodiment by way of example, the network apparatus may be a network instrument designed to be able to change over as to whether the network instrument takes part in a network as a wireless terminal or as an access point.

In the network apparatus, the return control unit establishes the connection with the first network apparatus again when the test unit determines that the connection with the second network apparatus is possible to establish as a result of the test to establish the connection with the second network apparatus.

In this case, the fact that the wireless connection with the second network apparatus can be established can be reported to the user's terminal via the network. Accordingly, the user can confirm on the user's terminal side the information reported from this device. Thus, without anxiety the user can execute control to change over the target of communication from the first network apparatus to the second network apparatus.

In the network apparatus, the return control unit establishes the connection with the first network apparatus again when the test unit determines that the connection with the second network apparatus is impossible to establish as a result of the test to establish the connection with the second network apparatus.

Therefore, the fact that the wireless connection with the second network apparatus cannot be established can be also reported to the user's terminal via the network. Accordingly, the user can confirm on the user's terminal side the information reported from this device. Thus, the user can recognize that there will be a problem in the second connection data when the control to change over the target of communication from the first network apparatus to the second network apparatus is executed, and can recognize that there will be a problem in the second connection data when the same control is tried. The user can take measures against the problem.

In the network apparatus, the connection control unit establishes the connection with the second network apparatus based on the second connection data when the network apparatus is requested from the user's terminal to change over a target of communication from the first network apparatus to the second network apparatus, after the test result transmitting unit transmits the test result data.

In this case, before the test result transmitting unit transmits the test result data, control to change over the target of communication from the first network apparatus to the second network apparatus is made only on trail. When the user further issues an instruction to execute the same control after the test result transmitting unit transmits the test result data, the wireless connection between this device and the second network apparatus is established. Accordingly, from the test result, the user can determine whether to execute the control to change over the target of communication from the first network apparatus to the second network apparatus.

In the network apparatus, after the test result transmitting unit transmits the test result data, the connection control unit establishes the connection with the second network apparatus based on the second connection data when the test unit determines that the connection with the second network apparatus is possible to establish, while the connection control unit maintains the connection with the first network apparatus established again by the return control unit when the test unit determines that the connection with the second network apparatus is impossible to establish.

In this case, without any new instruction from the user, when the wireless connection with the second network apparatus can be established, the device changes over to the state in which the wireless connection with the second network apparatus has been established. On the contrary, when the wireless connection with the second network apparatus cannot be established, the device maintains the state in which the wireless connection with the first network apparatus has been established. Thus, the operation to be performed by the user can be simplified.

In the network apparatus, the test unit determines that the connection with the second network apparatus is impossible to establish when the second network apparatus is not be detected, when association with the second network apparatus is not be established or when authentication with the second network apparatus is not be established.

In this case, when there is some problem in minimal data of the second connection data required for establishing wireless connection, a test result determining the wireless connection with the second network apparatus as impossible to establish is reported. Accordingly, the user can recognize the situation based on the reported information and take necessary measures against the situation.

In the network apparatus, the test unit determines that the connection with the second network apparatus is impossible to establish when a network address different from a network address assigned to the second network apparatus is registered in the network apparatus.

Therefore, the user can recognize the situation in which wireless connection with the second network apparatus itself can be established but the network address includes an error such that communication with another network apparatus cannot be gained via the second network apparatus. Thus, the user can take necessary measures against the situation.

In the network apparatus, the test unit tests a first test item, a second test item, a third test item and a fourth test item in the order as tests of establishing the connection with the second network apparatus, the first test item being a test as to whether the second network apparatus can be detected or not, the second test item being a test as to whether association with the second network apparatus can be established or not, the third test item being a test as to whether authentication with the second network apparatus is established or not, the fourth test item being a test as to whether a network address of the second network apparatus is established correctly or not, the test unit determines the first test item as passed when the second network apparatus is detected, the second test item as passed when the association with the second network apparatus is established, the third test item as passed when the authentication with the second network apparatus is established, and the fourth test item as passed when the network address of the second network apparatus is established correctly, the test unit determines the first test item as failed when the second network apparatus is not be detected, the second test item as failed when the association with the second network apparatus is not be established, the third test item as failed when the authentication with the second network apparatus is not established, and the fourth test item as failed when the network address of the second network apparatus is not established correctly, when a test result as to each of the test items is passed, the test unit executes a subsequent test item, while when a test result as to each of the test items is failed, the test unit cancels subsequent test items, and the wireless communication unit transmits results of all of the test items executed by the test unit as the test result data to the user's terminal.

When all the test items are carried out in such a procedure, it is possible to obtain more detailed information indicating how far the settings are successful or which setting is failed. Thus, the user can take measures easily against any problem if it occurs.

The network apparatus has a printing unit that prints on a paper-like recording medium; and a print control unit that controls the printing unit to print a result of the test executed by the test unit on the recording medium.

In this case, the test result can be preserved as a print.

In the network apparatus, the second network apparatus is a wireless access point, which stores the second connection data to be used for identifying a wireless network arranged around the wireless access point, and which enables to establish connection with a wireless terminal storing the second connection data, and the test unit controls the wireless communication unit based on the second connection data so as to try to establish the connection with the second network apparatus.

When the second network apparatus is the second wireless access point, the second wireless network identification information is used for identifying the second wireless network arranged around the second wireless access point. When the second wireless network identification information is different from identification information required for connection with the first network apparatus, the connection between this device and the first network apparatus will be cut due to the connection with the second wireless network. In this case, the test result can be reported from this device to the first network apparatus so that the information can be confirmed on the user's terminal side.

In the network apparatus, the second network apparatus is a wireless terminal, which stores the second connection data to be used for identifying a wireless network arranged with the wireless terminal, and which enables to establish connection with another wireless terminal storing the second connection data, and the test unit controls the wireless communication unit based on the second connection data so as to try to establish the connection with the second network apparatus.

When the second network apparatus is the second wireless terminal, the second wireless network identification information is used for identifying the second wireless network arranged with the second wireless terminal. When the second wireless network identification information is different from identification information required for connection with the first network apparatus, the connection between this device and the first network apparatus will be cut due to the connection with the second wireless network. In this case, the test result can be reported from this device to the first network apparatus so that the information can be confirmed on the user's terminal side.

In the network apparatus, the recording control unit records channel information indicating a wireless channel to be used for wireless communication with the second network apparatus into the second storage unit, and the test unit tries to establish the connection with the second network apparatus with using the channel information.

In the case of a wireless network, the wireless channel to be used for wireless communication with the second network apparatus may be different from the wireless channel to be used for wireless communication with the first network apparatus. In this case, the connection between this device and the first network apparatus will be cut due to the wireless connection with the second network apparatus. In this case, the test result can be reported from this device to the first network apparatus so that the information can be confirmed on the user's terminal side.

In the network apparatus, the first network apparatus is a wireless access point, which stores the first connection data to be used for identifying a wireless network arranged around the wireless access point, and which enables to establish connection with a wireless terminal storing the first connection data, and the connection control unit controls the wireless communication unit based on the first connection data so as to establish the connection with the first network apparatus.

When the first network apparatus is the first wireless access point, the first wireless network identification information is used for identifying the first wireless network arranged around the first wireless access point. When the first wireless network identification information is different from identification information required for connection with the second network apparatus, the connection between this device and the first network apparatus will be cut due to the connection with the second wireless network. In this case, the test result can be reported from this device to the first network apparatus so that the information can be confirmed on the user's terminal side.

In the network apparatus, the first network apparatus is a wireless terminal, which stores the first connection data to be used for identifying a wireless network arranged with the wireless terminal, and which enables to establish connection with another wireless terminal storing the first connection data, and the connection control unit controls the wireless communication unit based on the first connection data so as to establish the connection with the first network apparatus.

When the first network apparatus is the first wireless terminal, the first wireless network identification information is used for identifying the first wireless network arranged with the first wireless terminal. When the first wireless network identification information is different from identification information required for connection with the second network apparatus, the connection between this device and the first network apparatus will be cut due to the connection with the second wireless network. In this case, the test result can be reported from this device to the first network apparatus so that the information can be confirmed on the user's terminal side.

In the network apparatus, the connection control unit changes over between a first control mode where the network apparatus functions as a wireless access point and a second control mode where the network apparatus functions as a wireless terminal, so as to control the wireless communication unit to establish connection with the target of communication.

In this case, the network apparatus can be made to serve not only as a wireless access point but also as a wireless terminal. Accordingly, the network apparatus can set any one of the first wireless access point and the first wireless terminal as the first network apparatus as a target of communication, and any one of the second wireless access point and the second wireless terminal as the second network apparatus as a target of communication. Therefore, in comparison with the case where the device has one of the function as a wireless access point and the function as a wireless terminal, possible combinations of targets of communication can be widened, and in each combination, a test result can be reported from this device to the first network apparatus so that the information can be confirmed on the user's terminal side.

What is claimed is:

1. A network apparatus capable of communicating with a first network apparatus on a first network, the network apparatus comprising:
    a first storage unit that stores a first communication setting as a communication setting of the network apparatus;
    a communication unit that communicates with the first network apparatus based on the first communication setting;
    a receiving unit that receives a change instruction from the first network apparatus, the change instruction requesting a change of the communication setting from the first communication setting to a second communication setting, the second communication setting allowing the network apparatus to communicate with a second network apparatus located on a second network;
    a second storage unit that stores the second communication setting received by the receiving unit;
    a test unit disconnects the communication unit from the first network apparatus, and tests to determine whether the communication unit can establish a connection with the second network apparatus based on the second communication setting stored in the second storage unit;
    a notification unit that, in response to a test result obtained by the test unit, establishes the connection of the communication unit with the first network apparatus again, and notifies the first network apparatus of the test result; and a recording control unit that changes the communication setting stored in the first storage unit from the first communication setting to the second communication setting received by the receiving unit.

2. The network apparatus according to claim 1,
wherein when the first network apparatus is a wireless access point, a terminal unit capable of making communication via the wireless access point is a user's terminal, whereas when the first network apparatus is a wireless terminal, the wireless terminal is the user's terminal, and the test unit tries to establish the connection with the second network apparatus when the receiving unit receives the change instruction from the user's terminal to try to change over a target of communication from the first network apparatus to the second network apparatus.

3. The network apparatus according to claim 2,
wherein the notification unit that informs a user's terminal of test result data showing the test result of the connection with the second network apparatus after the connection with the first network apparatus is established again, wherein the notification unit informs the user's terminal of the test result data when the network apparatus is requested from the user's terminal to transmit the test result data.

4. The network apparatus according to claim 1,
wherein the communication unit establishes the connection with the first network apparatus again when the test unit determines that the connection with the second network apparatus is possible to establish as a result of the test to establish the connection with the second network apparatus.

5. The network apparatus according to claim 1,
wherein the communication unit establishes the connection with the first network apparatus again when the test unit determines that the connection with the second network apparatus is impossible to establish as a result of the test to establish the connection with the second network apparatus.

6. The network apparatus according to claim 3,
wherein the test unit establishes the connection of the communication unit with the second network apparatus based on the second communication setting when the network apparatus is requested from the user's terminal to change over a target of communication from the first network apparatus to the second network apparatus, after the notification unit transmits the test result data.

7. The network apparatus according to claim 6,
wherein the test unit determines that the connection with the second network apparatus is impossible to establish when the second network apparatus is not detected, when association with the second network apparatus is not established or when authentication with the second network apparatus is not established.

8. The network apparatus according to claim 7,
wherein the test unit determines that the connection with the second network apparatus is impossible to establish when a network address different from a network address assigned to the second network apparatus is registered in the network apparatus.

9. The network apparatus according to claim 8,
wherein the test unit tests a first test item, a second test item, a third test item and a fourth test item in an order as tests of establishing the connection with the second network apparatus, the first test item being a test as to whether the second network apparatus can be detected or not, the second test item being a test as to whether association with the second network apparatus can be established or not, the third test item being a test as to whether authentication with the second network apparatus is established or not, the fourth test item being a test as to whether a network address of the second network apparatus is established correctly or not, the test unit determines the first test item as passed when the second network apparatus is detected, the second test item as passed when the association with the second network apparatus is established, the third test item as passed when the authentication with the second network apparatus is established, and the fourth test item as passed when the network address of the second network apparatus is established correctly, the test unit determines the first test item as failed when the second network apparatus is not detected, the second test item as failed when the association with the second network apparatus is not established, the third test item as failed when the authentication with the second network apparatus is not established, and the fourth test item as failed when the network address of the second network apparatus is not established correctly, when the test result as to each of the test items is passed, the test unit executes a subsequent test item, while when the test result as to each of the test items is failed, the test unit cancels subsequent test items, and the communication unit transmits results of all of the test items executed by the test unit as the test result data to the notification unit.

10. The network apparatus according to claim 1,
wherein after the notification unit transmits the test result, the communication unit establishes the connection with the second network apparatus based on the second communication setting when the test unit determines that the connection with the second network apparatus is possible to establish, while the communication unit maintains the connection with the first network apparatus established again by the notification unit when the test unit determines that the connection with the second network apparatus is impossible to establish.

11. The network apparatus according to claim 1, further comprising:
a printing unit that prints on a recording medium; and
a print control unit that controls the printing unit to print a result of the test executed by the test unit on the recording medium.

12. The network apparatus according to claim 1,
wherein the second network apparatus is a wireless access point, which stores the second communication setting to be used for identifying a wireless network arranged around the wireless access point, and which enables to establish connection with a wireless terminal storing the second communication setting, and the test unit controls the communication unit based on the second communication setting so as to try to establish the connection with the second network apparatus.

13. The network apparatus according to claim 12,
wherein the recording control unit records channel information indicating a wireless channel to be used for wireless communication with the second network apparatus into the second storage unit, and the test unit tries to establish the connection with the second network apparatus using the channel information.

14. The network apparatus according to claim 12,
wherein the first network apparatus is a wireless access point, which stores the first communication setting to be used for identifying a wireless network arranged around the wireless access point, and which enables to establish connection with a wireless terminal storing the first communication setting, and the communication unit establishes the connection with the first network apparatus based on the first communication setting.

15. The network apparatus according to claim 12,
wherein the first network apparatus is a wireless terminal, which stores the first communication setting to be used for identifying a wireless network arranged with the wireless terminal, and which enables to establish connection with another wireless terminal storing the first communication setting, and the communication unit establishes the connection with the first network apparatus based on the first communication setting.

16. The network apparatus according to claim 12,
further comprising a connection control unit that changes over between a first control mode where the network apparatus functions as a wireless access point and a second control mode where the network apparatus functions as a wireless terminal, so as to control the communication unit to establish the connection.

17. The network apparatus according to claim 1,
wherein the second network apparatus is a wireless terminal, which stores the second communication setting to be used for identifying a wireless network arranged with the wireless terminal, and which enables to establish connection with another wireless terminal storing the second communication setting, and the test unit controls the communication unit based on the second communication setting so as to try to establish the connection with the second network apparatus.

18. The network apparatus according to claim 17,
wherein the recording control unit records channel information indicating a wireless channel to be used for wireless communication with the second network apparatus into the second storage unit, and the test unit tries to establish the connection with the second network apparatus using the channel information.

19. The network apparatus according to claim 17,
wherein the first network apparatus is a wireless access point, which stores the first communication setting to be used for identifying a wireless network arranged around the wireless access point, and which enables to establish connection with a wireless terminal storing the first communication setting, and the communication unit establishes the connection with the first network apparatus based on the first communication setting.

20. The network apparatus according to claim 17,
wherein the first network apparatus is a wireless terminal, which stores the first communication setting to be used for identifying a wireless network arranged with the wireless terminal, and which enables to establish connection with another wireless terminal storing the first communication setting, and the communication unit establishes the connection with the first network apparatus based on the first communication setting.

21. The network apparatus according to claim 17,
further comprising a connection control unit that changes over between a first control mode where the network apparatus functions as a wireless access point and a second control mode where the network apparatus functions as a wireless terminal, so as to control the communication unit to establish the connection.

22. The network apparatus according to claim 1,
wherein the recording control unit changes the communication setting stored in the first storage unit from the first communication setting to the second communication setting, if the test result indicates a success of an establishment of connection with the second network apparatus, and wherein the recording control unit maintains the communication setting stored in the first storage unit to the first communication setting, if the test result indicates a failure of the establishment of connection with the second network apparatus.

23. The network apparatus according to claim 1,
wherein the first storage unit comprises a nonvolatile memory, wherein the second storage unit comprises a volatile memory, wherein, the recording control unit records the first communication setting stored in the first storage unit into the second storage unit so as to allow the communication unit to establish a connection with the first network apparatus, and the communication unit establishes the connection with the first network apparatus using the first communication setting stored in the second storage unit, and wherein, in response to the change instruction received by the receiving unit:
the recording control unit changes the communication setting stored in the second storage unit from the first communication setting to the second communication setting;
the test unit conducts the test;
the recording control unit changes the communication setting stored in the second storage unit from the second communication setting to the first communication setting; and
the notification unit notifies the first network apparatus of the test result.

24. The network apparatus according to claim 1,
wherein the first communication setting comprises a setting value of a setting item required for establishing a wireless communication with the first network apparatus, and wherein the second communication setting comprises a setting value of a setting item required for establishing a wireless communication with the second network apparatus.

25. The network apparatus according to claim 24,
wherein at least one of the first communication setting and the second communication setting comprises a setting value of a setting item required for establishing a communication through an access point.

* * * * *